United States Patent
Tsujino et al.

(10) Patent No.: US 8,718,823 B2
(45) Date of Patent: May 6, 2014

(54) THEREMIN-PLAYER ROBOT

(75) Inventors: Hiroshi Tsujino, Saitama (JP); Hiroshi Okuno, Kyoto (JP); Takeshi Mizumoto, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 12/899,516

(22) Filed: Oct. 6, 2010

(65) Prior Publication Data

US 2011/0118871 A1    May 19, 2011

Related U.S. Application Data

(60) Provisional application No. 61/249,730, filed on Oct. 8, 2009.

(51) Int. Cl.
G05B 15/00    (2006.01)

(52) U.S. Cl.
USPC ............. 700/262; 84/477 R; 84/609; 84/615; 84/622; 84/649; 84/653; 84/659; 700/254; 700/258

(58) Field of Classification Search
USPC ....... 84/304, 306, 454, 200, 477 R, 609, 615, 84/616, 626, 633, 649, 653, 654, 659, 662, 84/665; 700/245, 255, 247, 250, 253, 254, 700/258, 262
See application file for complete search history.

(56) References Cited

U.S. PATENT DOCUMENTS

| | | | | |
|---|---|---|---|---|
| 3,230,614 A | * | 1/1966 | Rasch | 29/896.2 |
| 4,426,907 A | * | 1/1984 | Scholz | 84/454 |
| 4,803,908 A | * | 2/1989 | Skinn et al. | 84/454 |
| 5,107,746 A | * | 4/1992 | Bauer | 84/626 |
| 5,290,964 A | * | 3/1994 | Hiyoshi et al. | 84/600 |
| 5,824,929 A | * | 10/1998 | Freeland et al. | 84/454 |
| 7,935,876 B1 | * | 5/2011 | West | 84/304 |

OTHER PUBLICATIONS

Alford et al.; "Music Playing Robot"; Proceedings of the 1999 International Conference on Field and Service Robotics (FSR '99); Aug. 29-31, 1999; Pittsburgh, PA; pp. 174-178.*

Murata et al., "A Robot Uses its Own Microphone to Synchronize its Steps to Musical Beats While Scatting and Singing". Proc. of IEEE/RSJ Intl. Conf. on Intelligent Robots and Systems (IROS), pp. 2459-2464 (2008).

Kosuge et al., "Dance Partner Robot—Ms DanceR", Proc. of IEEE/RSJ Intl. Conf. on Intelligent Robots and Systems (IROS), pp. 3459-3464 (2003).

Mizumoto et al., "A Robot Listens to Music and Counts its Beats Aloud by Separating Music from Counting Voice", Proc. of IEEE/RSJ Intl. Conf. on Intelligent Robots and Systems (IROS), pp. 1538-1543 (2008).

(Continued)

*Primary Examiner* — Stephen Holwerda

(74) *Attorney, Agent, or Firm* — Chen Yoshimura LLP

(57) ABSTRACT

A thereminist robot has a characteristic model of theremin and is capable of performing in response to an environment of theremin performance by calibrating the characteristic model before the performance. A robot 10 has a first arm 12, a second arm 11, and a pitch model for indicating an arm position corresponding to a pitch of the theremin The robot 10 plays the theremin by moving the first arm 12 to the arm position corresponding to a musical note based on the target note and the pitch model. The robot further has a parameter adjustment unit for adjusting parameters of the pitch model that change depending on environments surrounding the theremin.

4 Claims, 16 Drawing Sheets

(56) References Cited

OTHER PUBLICATIONS

Murata et al., "A Robot Uses its Own Microphone to Synchronize its Steps to Musical Beats While Scatting and Singing", Proc. of IEEE/RSJ Intl. Conf. on Intelligent Robots and Systems (IROS), pp. 2459-2464 (2008).

Nakaoka et al., "Task Model of Lower Body Motion for a Biped Humanoid Robot to Imitate Human Dances", Proc. of IEEE/RSJ Intl. Conf. on Intelligent Robots and Systems (IROS), pp. 2769-2774 (2005).

Kosuge et al., "Dance Partner Robot—Ms DanceR", Proc. of IEEE/RSJ Intl. Conf. on Intelligent Robots and Systems.(IROS), pp. 3459-3464 (2003).

Yoshii et al., "A Biped Robot that Keeps Steps in Time with Musical Beats while Listening to Music with its Own Ears", Proc. of IEEE/RSJ Intl. Conf. on Intelligent Robots and Systems (IROS), pp. 1743-1750 (2007).

Sugano et al., "WABOT-2: Autonomous robot with dexterous finger-arm—Finger-arm coordination control in keyboard performance -", Proc. of IEEE Intl. Conf. on Robotics and Automation (ICRA), pp. 90-97 (1987).

Shibuya et al., "Toward Developing a Violin Playing Robot—Bowing by Anthropomorphic Robot Arm and Sound Analysis -", Proc. of IEEE Intl. Conf. on Robot and Human Interactive Communication (RO-MAN), pp. 763-768 (2007).

Solis et al., "The Anthropomorphic Flutist Robot WF-4R: from mechanical to perceptual improvements", IEEE/RSJ Intl. Conf. on Intelligent Robots and Systems, 2005, pp. 1929-1934.

Solis et al., "Development of Anthropomorphic Musical Performance Robots: From Understanding the Nature of Music Performance to its Application to Entertainment Robotics", Proc. of IEEE/RSJ Intl. Conf. on Intelligent Robots and Systems (IROS), pp. 2309-2314 (2009).

Petersen et al., "Development of a Aural Real-Time Rhythmical and Harmonic Tracking to Enable the Musical Interaction with the Waseda Flutist Robot", Proc. of IEEE/RSJ Intl. Conf. on Intelligent Robots and Systems (IROS), pp. 2303-2308 (2009).

Weinberg et al., "Interactive Jamming with Shimon: A Social Robotic Musician", Proc. of ACM/IEEE Intl. Conf. on Human-Robot Interaction (HRI), pp. 233-234 (2009).

Hulst, "Robotic Theremin Player", Proc. of National Advisory Committee on Computing Qualifications (NACCQ), p. 534 (2004).

Alford et al., "Music Playing Robot", Center for Intelligent Systems, Vanderbilt University, Nashville, Tennessee.

Marquardt, "An Algorithm for Least-Squares Estimation of Nonlinear Parameters", SIAM Journal on Applied Mathematics, vol. 11, No. 2, pp. 431-441 (Jun. 1963).

Madsen et al., "Methods for Non-Linear Least Squares Problems (2nd ed.)", Informatics and Mathematical Modelling (IMM), Technical University of Denmark, DTU (Apr. 2004).

Skeldon et al., "Physics of the Theremin", American Journal of Physics, vol. 66, No. 11, pp. 945-955 (Nov. 1998).

Camacho, "SWIPE: A sawtooth waveform inspired pitch estimator for speech and music", PhD Thesis, University of Florida (2007).

Toussaint et al., "Optimization of sequential attractor-based movement for compact behaviour generation", Proc. of IEEE/RAS Intl. Conf. on Humanoid Robots (Humanoids) (2007).

Saitou et al., "Development of an F0 control model based on F0 dynamic characteristics for singing-voice synthesis", Speech Comm., vol. 46, pp. 405-417 (2005).

\* cited by examiner

Experiment 1 : Learning Sample Number And Model Error

Musical Score Of Nursery rhyme "Frog Song"

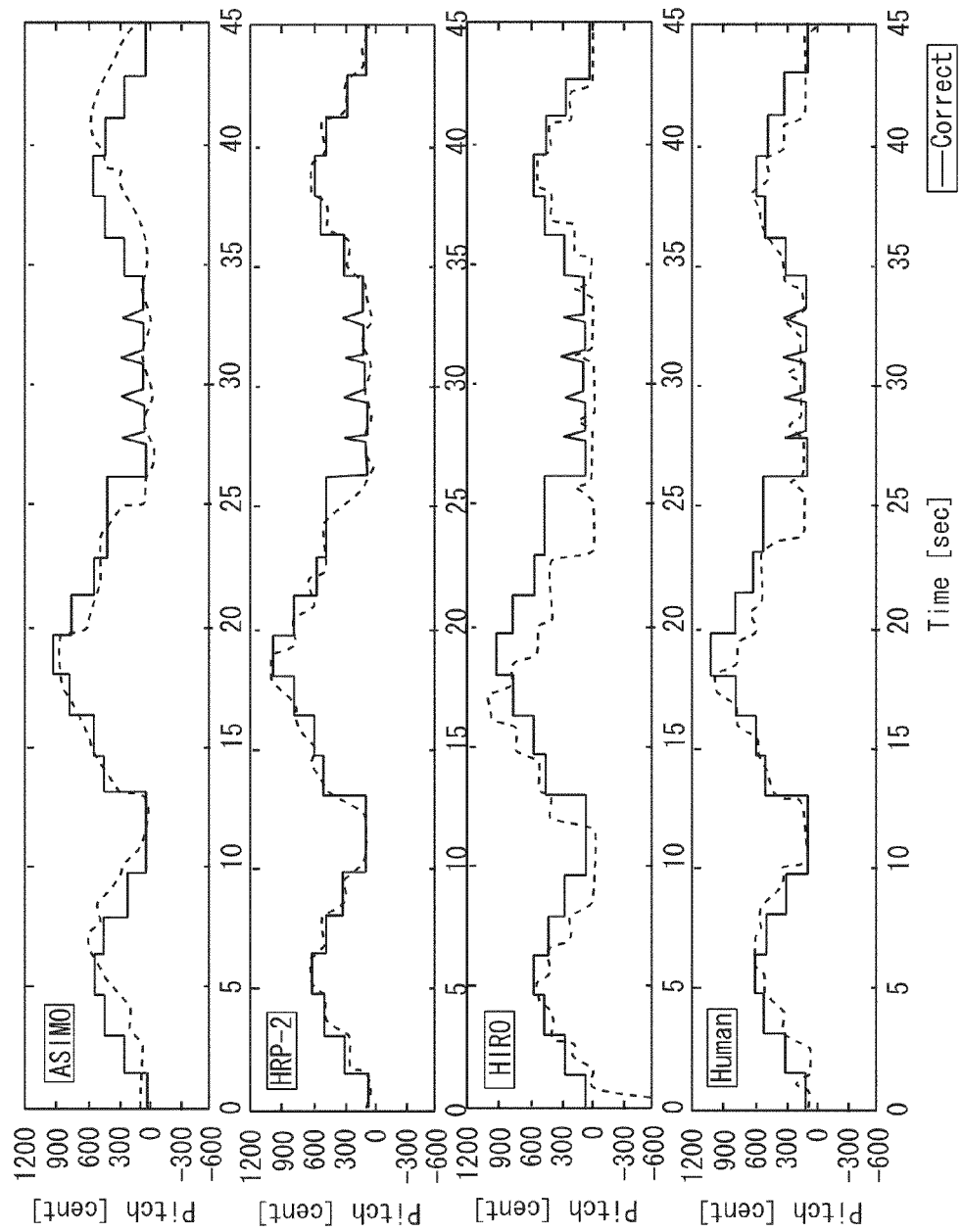

THEREMIN-PLAYER ROBOT

TECHNICAL FIELD

The present invention relates to a thereminist robot, particularly a thereminist robot capable of playing a desired music even though theremin characteristics are changed by a surrounding environment.

BACKGROUND ART

Because of recent advances of control logic, image processing, and sound recognition technology, robots have broadened a scope of application from an industrial use to an entertainment use. Many entertainment robots such as a pet robot AIBO® produced by Sony Co. and a toy-humanoid robot i-SOBOT® produced by Tomy Company, Ltd. are released in the market. Among entertainment robots, a music-related robot (hereinafter referred to as music robot) is expected to become important in the future because music holds a prominent place as leisure and to grow in the future as well.

Among music robots, playing an instrument robot is a promising field where interactive entertainment is provided by playing in concert between humans and robots.

An expression method of the music robot is classified into (1) sound such as singing songs, (2) motion such as dancing, and (3) playing an instrument.

As a robot singing songs of the classification (1), a robot that counts beats is disclosed in non-patent literature 1 and a biped robot that sings while stepping to beats is disclosed in non-patent literature 2. The both robots use sound obtained from a microphone mounted on the robot as an input sound.

As a dancing robot of the classification (2), a biped robot that dances by imitating a whole human body motion is disclosed in non-patent literature 3. A robot that social-dances by arms and wheel movement is disclosed in non-patent literature 4. A robot that keeps steps to sounds listened to by itself is disclosed in non-patent literature 5.

With respect to a robot playing an instrument of the classification (3), there are reports on a solo player and a concert player. As for the solo player, a whole body humanoid robot WABOT-2™ that plays the keyboard but has no walking function is disclosed in non-patent literature 6. A humanoid robot that plays the violin and has both arms and an upper body is disclosed in non-patent literature 7. Most of the robots except for the WABOT-2™ of the non-patent literature 6 play not melody but a single sound. However, in recent years, a humanoid robot WF-4RIV™ that plays the flute in non-patent literature 9 and a robot WAS-1™ in non-patent literature 10 that has only artificial lips and fingers and plays the saxophone have actually played a complex melody. Task of these robots is inputting MIDI-form scores and target pitches and faithfully following them. With respect to playing in concert with the human, a simple concert robot that plays in turns is disclosed in non-patent literature 11, and improvisational concert robots are disclosed in non-patent literature 13.

Theremin is most different from musical instruments subjected by conventional studies. Theremin can be played without physical contact between a robot and an instrument. Therefore, special hardware such as artificial lips required for playing the flute and the saxophone and a precision finger mechanism required for playing the keyboard is not necessary. Theremin can be played by many robots that satisfy requirement of having two arms. Consequently, a thereminist system is expected to be highly portable because they are implemented on many existing robots.

There are two problems with playing the theremin:
(A1) there exists no physical reference point as a basis during playing, unlike a keyboard of piano and a fret of guitar,
(A2) relation between pitch and volume of theremin and position of both arms (hereinafter referred to as pitch characteristics and volume characteristics) changes depending on surrounding environments such as temperature and number of people (hereinafter referred to as environment capacitance). In other words, an adaptive control is required. This is because the pitch characteristics and the volume characteristics change in response to the environment capacitance, and the environment changes every second even if sufficient preparation is possible in advance. Although elaboration is possible if information about the environment is known in advance, a playing method adaptive to an unknown environment by a small number of measurement is indispensable for actually playing in various environments.

Especially for playing in concert, an adaptive playing method is a key to the concert because other players affect an environmental capacitance.

Ordinarily, the thereminist robot has to play melodies in such a state that it is in proximity to partners during the concert. Two requirements for realizing that are as follows:
(1) quick arm control, and
(2) adaptation to different environmental capacitance.

Item (1) is required for playing the melody. Because sounds of theremin continuously change, an audience cannot recognize sound lines played by a robot, unless the robot quickly moves its arm to a target position and stands still at a move destination. Item (2) is required for playing in concert where other players are nearby.

In consideration of these requirements, a quantitative pitch control has been conventionally studied. Approaches to pitch control are divided into two controls: feedback control shown in non-patent literature 14 and others and feedforward control shown in non-patent literature 15 and others.

The feedback control allows accurate pitch control because an arm position is adjusted by listening to theremin sound during a performance. However, the feedback control does not satisfy the above-mentioned requirements (1) and (2) due to the following reasons:

Firstly, it is impossible to play the melody in which target values continuously change in less than one second in some pieces of music, because it takes much time to reach a target pitch.

Secondly, it is difficult for an audience to recognize the melody being played because the pitch has to be gradually changed in sequence to realize the feedback control.

On the contrary, the feedforward control satisfies the requirement (1) because quick arm control is possible. However, it is indispensable to deal with robustness of a model used for estimating a target position of arm (the requirement (2)). For the feedforward control, an appropriate target position should be estimated without listening to an actual sound. The estimation is missed unless the changing environmental capacitance is embedded in a model.

A feedforward control method based on a lookup table is proposed in non-patent literature 15. In this method, a table for outputting an appropriate joint angle to all pitch names (e.g. C3, D4) being played is prepared in advance, and an arm is controlled based on the table during performance.

CITATION LIST

Non Patent Literature

[Non-patent literature 1] Mizumoto, T., Takeda, R., Yoshii, K., Komatani, K., Ogata, T. and Okuno, H. G.: A Robot Listens to Music and Counts Its Beats Aloud by Separating Music from Counting Voice, Proc. of IEEE/RSJ Intl. Conf. on Intelligent Robots and Systems (IROS), pp. 1538-1543 (2008).

[Non-patent literature 2] Murata, K., Nakadai, K., Yoshii, K., Takeda, R., Torii, T., Okuno, H. G., Hasegawa, Y. and Tsujino, H.: A Robot Uses Its Own Microphone to Synchronize Its Steps to Musical Beats While Scatting and Singing, Proc. of IEEE/RSJ Intl. Conf. on Intelligent Robots and Systems (IROS), pp. 2459-2464 (2008).

[Non-patent literature 3] Nakaoka, S., Nakazawa, A., Kanehiro, F., Kaneko, K., Morisawa, M. and Ikeuchi, K.: Task Model of Lower Body Motion for a Biped Humanoid Robot to Imitate Human Dances, Proc. of IEEE/RSJ Intl. Conf. on Intelligent Robots and Systems (IROS), pp. 2769-2774 (2005).

[Non-patent literature 4] Kosuge, K., Hayashi, T., Hirata, Y. and Tobiyama, R.: Dance Partner Robot—Ms DanceR, Proc. of IEEE/RSJ Intl. Conf. on Intelligent Robots and Systems (IROS), pp. 3459-3464 (2003).

[Non-patent literature 5] Yoshii, K., Nakadai, K., Torii, T., Hasegawa, Y., Tsujino, H., Komatani, K., Ogata, T. and Okuno, H. G.: A Biped Robot that Keeps Steps in Time with Musical Beats while Listening to Music with Its Own Ears, Proc. of IEEE/RSJ Intl. Conf. on Intelligent Robots and Systems (IROS), pp. 1743-1750 (2007).

[Non-patent literature 6] Sugano, S. and Kato, I.: WABOT-2: Autonomous robot with dexterous finger-arm—Finger-arm coordination control in keyboard performance—, Proc. of IEEE Intl. Conf. on Robotics and Automation (ICRA), pp. 90-97 (1987).

[Non-patent literature 7] Shibuya, K., Matsuda, S. and Takahara, A.: Toward Developing a Violin Playing Robot—Bowing by Anthropomorphic Robot Arm and Sound Analysis—, Proc. of IEEE Intl. Conf. on Robot and Human Interactive Communication (RO-MAN), pp. 763-768 (2007).

[Non-patent literature 9] Solis, J., Chida, K., Isoda, S., Suefuji, K., Arino, C., and Takanishi, A,: The Anthropomorphic Flutist Robot WF-4R: from mechanical to perceptual Improvements, IEEE/RSJ Intl. Conf. on Intelligent Robots and Systems, pp. 1929-1934 (2005).

[Non-patent literature 10] Solis, J., Petersen, K., Ninomiya, T., Takeuchi, M. and Takanishi, A.: Development of Anthropomorphic Musical Performance Robots: From Understanding the Nature of Music Performance to Its Application to Entertainment Robotics, Proc. of IEEE/RSJ Intl. Conf. on Intelligent Robots and Systems (IROS), pp. 2309-2314 (2009).

[Non-patent literature 11] Petersen, K., Solis, J. and Takanishi, A.: Development of a Aural Real-Time Rhythmical and Harmonic Tracking to Enable the Musical Interaction with the Waseda Flutist Robot, Proc. of IEEE/RSJ Intl. Conf. on Intelligent Robots and Systems (IROS), pp. 2303-2308 (2009).

[Non-patent literature 13] Weinberg, G., Raman, A. and Mallikarjuna, T.: Interactive Jamming with Shimon: A Social Robotic Musician, Proc. of ACM/IEEE Intl. Conf. on Human-Robot Interaction (HRI), pp. 233-234 (2009).

[Non-patent literature 14] Frank van der Hulst: Robotic Thereimin Player, Proc. of National Advisory Committee on Computing Qualifications, p. 534 (2004).

[Non-patent literature 15] Alford, A., Northrup, S., Kawamura, K., w. Chan, K. and Barile, J.: Music Playing Robot, Center for Intelligent Systems Vanderbilt University Nashville, Tenn.

[Non-patent literature 16] Marquardt, D.: An Algorithm for Least-Squares Estimation of Nonlinear Parameters, SIAM Journal on Applied Mathematics, Vol. 11, No. 2, pp. 431-441 (1963).

[Non-patent literature 17] Madsen, K., Nielsen, H. B. and Tingleff, O.: Methods for Non-Linear Least Squares Problems (2nd ed.), Informatics and Mathematical Modelling, Technical University of Denmark, DTU (2004).

[Non-patent literature 18] Skeldon, K. D., Reid, L. M., McInally, V., Dougan, B. and Fulton, C.: Physics of the Theremin, American Journal of Physics, Vol. 66, No. 11, pp. 945-955 (1998).

[Non-patent literature 19] Camacho, A.: SWIPE: A sawtooth waveform inspired pitch estimator for speech and music, PhD Thesis, University of Florida (2007).

[Non-patent literature 20] Toussaint, M., Gienger, M. and Goerick, C.: Optimization of sequential attractor-based movement for compact behaviour generation, Proc. of IEEE/RAS Intl. Conf. on Humanoid Robots (Humanoids) (2007).

[Non-patent literature 21] Saitou, T., Unoki, M. and Akagi, M.: Development of an F0 control model based on F0 dynamic characteristics for singing-voice synthesis, Speech Comm, Vol. 46, pp. 405-417 (2005).

SUMMARY OF INVENTION

Technical Problem

However, the method of non-patent literature 15 takes time because it is required to find the appropriate joint angle for every pitch name being played through try and error during preparation of the table. Therefore, a time-consuming rebuilding of table is required every time an environmental capacitance changes.

The present invention is created in consideration of the above description, and an object of the present invention is to provide a thereminist robot that has a theremin characteristic model and is capable of performing in response to a theremin performance environment by calibrating the characteristic model before performance.

Solution to Problem

In order to achieve the above-described object, according to a first configuration of the present invention, a thereminist robot for playing theremin comprises: a first arm and a second arm; and a pitch model for indicating an arm position corresponding to a pitch of the theremin, wherein the theremin is played by moving the first arm to the arm position corresponding to a musical note based on the target note and the pitch model, and a parameter adjustment unit for adjusting parameters of the pitch model that change depending on environments surrounding the theremin.

According to the thereminist robot of the present invention, the second arm is for volume control, a volume model for indicating an arm position corresponding to a volume of the theremin is included, and the parameter adjustment unit adjusts parameters of the volume model that change depending on environments surrounding the theremin.

In order to achieve the above object, according to a second configuration of the present invention, a thereminist robot for playing theremin comprises: a volume model indicating an arm position corresponding to a volume of the theremin, wherein the theremin is played by moving an arm to a specified position based on a volume set in the theremin and the volume model, and a parameter adjustment unit for adjusting parameters of the volume model that change depending on environments surrounding the theremin.

According to the thereminist robot of the present invention, preferably after moving the arm, feedback control is carried out for adjusting a position of the arm during continuation of the notes.

Advantageous Effects of Invention

According to the present invention, the pitch sound corresponding to desired pitch name is played from the theremin by adjusting the position of the arm to a pitch antenna of the theremin, regardless of environments surrounding the robot, in other words, a state of the theremin that is affected by electromagnetic field of the playing site.

According to a pitch control method, the pitch of the theremin is not a subject to be searched as in non-patent literature 15 but treated as learning data for estimating parameters. Therefore, the pitch not used for learning data can be also appropriately complemented. Thus, arbitrary pitch can be outputted by a few data as learning data.

Further, theremin is played with pitch corresponding to the pitch names and desired volume by adjusting the position of the arm to a volume antenna, regardless of environments surrounding the robot, in other words, a state of the theremin that is affected by electromagnetic field of the playing site. Specifically, a position of the arm for volume is adjusted by adding the volume variation by the arm for controlling the pitch.

In the pitch model and the volume model, only theremin characteristics are modeled but physical restriction of the robot is not included. Therefore, the pitch control and volume control are separated into a portion depending on the hardware and a portion independent of the hardware. If it is desired to mount on the other root, only the portion dependent on the robot is replaced.

BRIEF DESCRIPTION OF DRAWINGS

FIG. 17 is a graph showing a result of Experiment 4.

DESCRIPTION OF EMBODIMENTS

Figure 1:
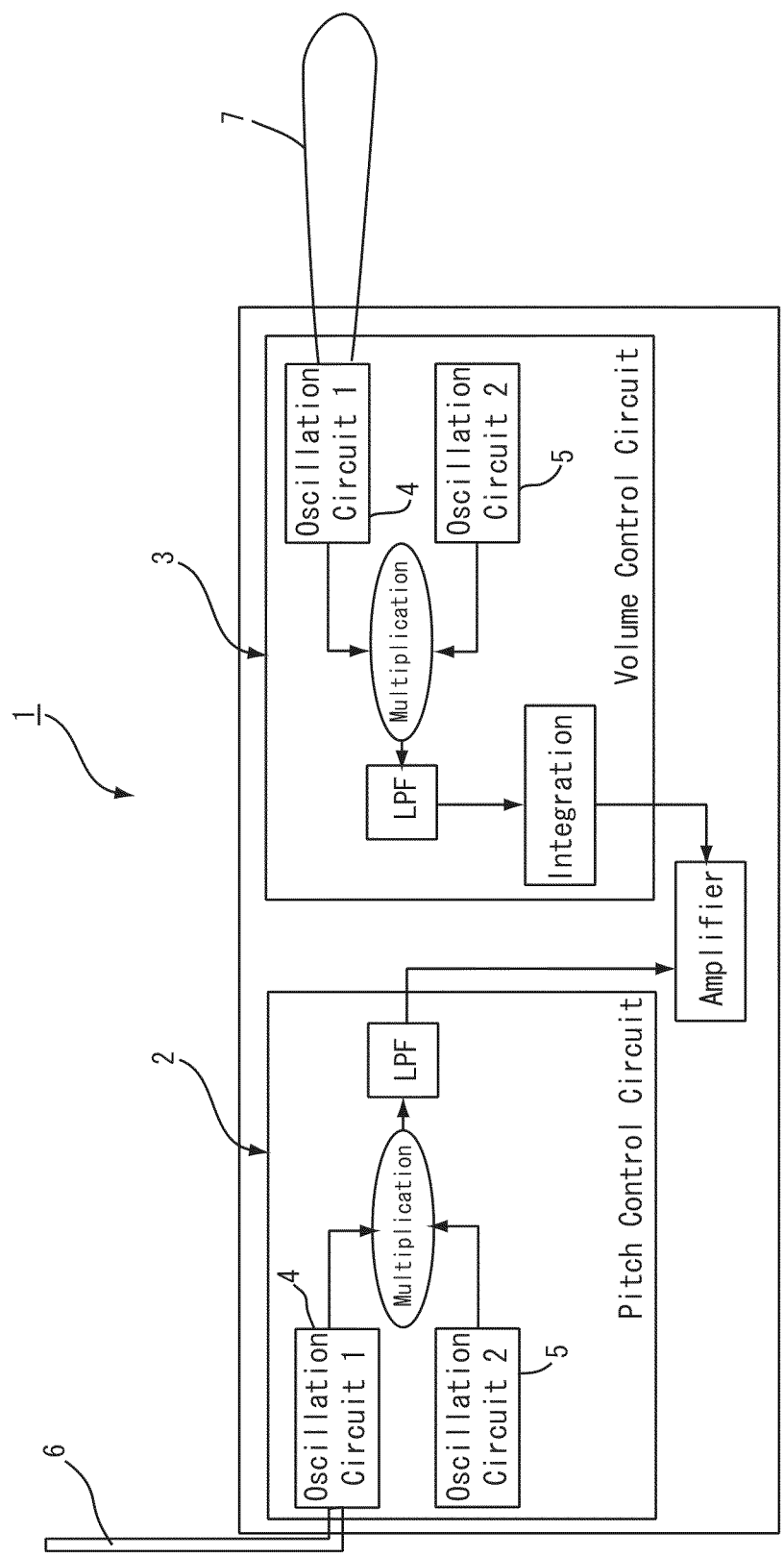
FIG. 1 is a schematic diagram of a theremin

Hereinafter, embodiments of the present invention are described in detail in the order of the following items, referring to drawings where necessary:
A. Operating principle of theremin
B. Outline of first embodiment
C. Configuration of thereminist robot
D. Operation of thereminist robot
D-1. Operation of calibration phase
D-2. Operation of playing phase
E. Second embodiment
F. Operation of second embodiment
F-1. Operation of calibration phase
F-2. Operation of playing phase
G. Comparison Example of model
H. Evaluation Experiment of pitch model and volume model
I. Others A. Operation Principle of Theremin As shown in a schematic diagram of theremin of FIG. 1, theremin 1 is configured by two types of circuits 2, 3 for pitch control and volume control. Respective types of the circuits 2, 3 have oscillation circuits 4, 5, and condensers 6, 7 of respective types of the circuits are projected out as antennae (hereinafter referred to as a pitch antenna 6 and a volume antenna 7). Because pitch and volume of the theremin 1 are controlled using beats created by a difference in oscillation frequency between respective oscillation circuits 4, 5, the pitch and volume can be controlled by changing a hand position of player. The beat is a frequency created by multiplication of outputs of two oscillation circuits 4, 5, and it has frequency components of f1−f2, f1+f2, provided the respective oscillation frequencies are f1, f2. The pitch control circuit 2 extracts only the frequency component, f1−f2, of the beat by using a Low Pass Filter (LPF) and outputs it. Here, thus extracted frequency becomes a pitch of output sound of the theremin. Meanwhile, the volume control circuit 3 extracts a frequency component by using LPF as well, integrates it, and makes it a control input of an amplifier immediately before output of pitch.

In a hypothetical condenser (1), it is assumed that the pitch antenna 6 and a player's right hand are conductors and that a space between the pitch antenna 6 and a player's right hand is a nonconductor, and in a hypothetical condenser (2), it is assumed that the volume antenna 7 and the player's left hand are conductors and that a space between the volume antenna 7 and the player's left hand is a nonconductor. Electrostatic capacitances(environmental capacitances) of the hypothetical condensers (1) (2) determine a pitch ($\alpha 1$) and a volume ($\alpha 2$) of output sound of the theremin 1. Therefore, the environmental capacitance changes as the player moves their hand position to change a distance between the conductors of the condenser. An oscillation frequency of the oscillation circuit 4 consequently changes.

Because the environmental capacitance determining the pitch and volume of the theremin 1 varies depending on time, it is difficult to obtain in advance. Since an air between the hand and the antenna is a nonconductor configuring the condenser, surrounding changes of the theremin 1 such as temperature and position and number of surrounding people affect the electrostatic capacitance. Therefore, an assumption that an environmental capacitance is constantly stable is not realistic. According to the present embodiment where a volume characteristic and pitch characteristic are parametrically modeled, this problem is solved by reestimating the parameter on a regular basis.

Hereinafter, a first embodiment for adjusting a pitch characteristic and a second embodiment for adjusting the pitch and volume characteristics are described in order.

B. Outline of a First Embodiment

Figure 2:
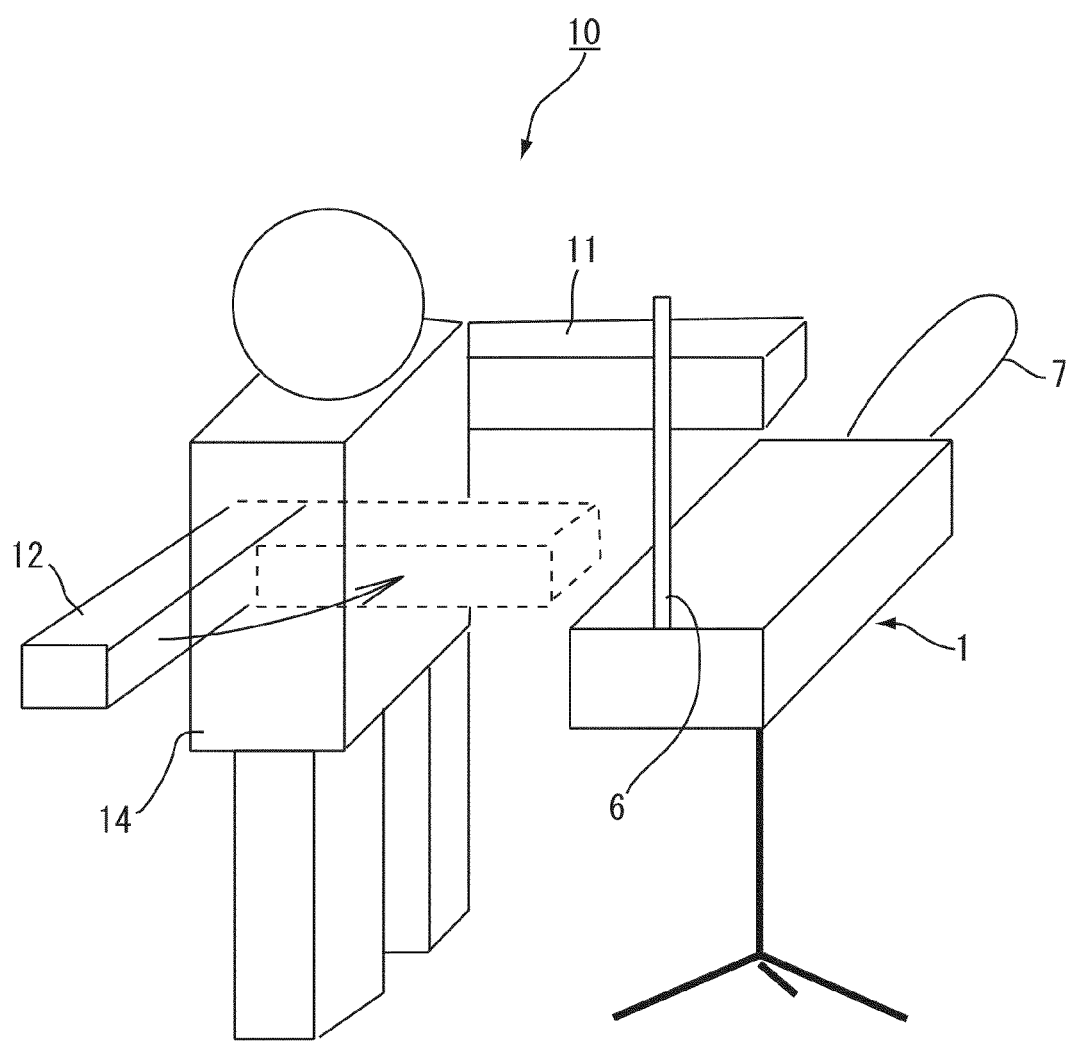
FIG. 2 is a schematic perspective diagram of a thereminist robot according to a first embodiment of the present invention.

A thereminist robot 10 according to a first embodiment of the present invention (hereinafter simply referred to as a robot in some cases) has a left arm 11 and a right arm 12 as shown in FIG. 2 and plays the theremin 1 by changing a position of a tip end of the right arm 12 (hereinafter referred to as pitch arm in some cases) as a first arm toward the pitch antenna 6 of the theremin 1. Specifically, a tone of sound, so-called pitch, that is emitted from the theremin 1 changes by changing a position of the right arm 12 toward the pitch antenna 6.

Specifically, an electrostatic capacitance of the pitch antenna 6 of the theremin 1 changes under the influence of environmental capacitance, and the pitch changes even if a distance between the antenna 6 and the pitch arm 12 is equal. Therefore, for performance, the thereminist robot 10 according to the present embodiment adjusts the position of the right arm 12 toward the pitch antenna 6 in response to environmental capacitance so that the pitch corresponding to the musical note the theremin 1 plays.

Therefore, the thereminist robot 10 according to the present embodiment is provided with a model expressing pitch characteristic, how the pitch changes at respective tip end positions of the right arm 12, in response to environmental capacitance. Hereinafter, this model is referred to as a pitch model.

The pitch model is formulated as follows where the pitch characteristic is used as a nonlinear function between the position of the pitch arm 12 and the environmental capacitance.

[Formula 1]

$$\hat{p} = M_p(x_p; \theta) = \frac{\theta_2}{(\theta_0 - x_p)^{\theta_1}} + \theta_3 \quad (1)$$

where $M_p(x_p;\theta)$ is a pitch model, $x_p$ is a position of the pitch arm 12, $\theta=(\theta_0,\theta_1,\theta_2,\theta_3)$ is a model parameter, p is a pitch [Hz] estimated by the pitch model. The first term represents a speed of pitch increase of the environmental capacitance in response to the parameter θ, and the second term represents the pitch when the pitch arm is away from the the antenna 6 sufficiently.

When the thereminist robot 10 plays the theremin 1, the robot 10 does not use the above-described pitch model but uses its inverse model. In other words, in a playing stage, $\theta_0,\theta_1,\theta_2,\theta_3$ in the parameter specified in response to the environment is determined by a calibration described later. A position $x_p$ of the right arm 12 is obtained from the inverse model of the above formula so that the pitch being a target as a playing note may be played. The inverse model is expressed as the following formula.

[Formula 2]

$$\hat{x}_p = M_p^{-1}(p, \theta) = \theta_0 - \left(\frac{\theta_2}{p - \theta_3}\right)^{1/\theta_1} \quad (2)$$

In other words, this formula is for converting the pitch into the target position $x_p$ of the pitch arm 12. It is possible to analytically obtain the arm position $x_p$ by calculating the inverse function represented by this formula.

The thereminist robot 10 calibrates the model parameter $\theta_0,\theta_1,\theta_2,\theta_3$ for using the inverse model suitable for a usage environment. After calibration of the pitch model, the thereminist robot 10 plays as desired.

Thus, the thereminist robot 10 operates with two modes: a calibration phase for determining the parameter $\theta_0,\theta_1,\theta_2,\theta_3$ of the pitch model and a playing phase for playing the theremin based on the parameter $\theta_0,\theta_1,\theta_2,\theta_3$.

C. Configuration of Thereminist Robot

Figure 3:
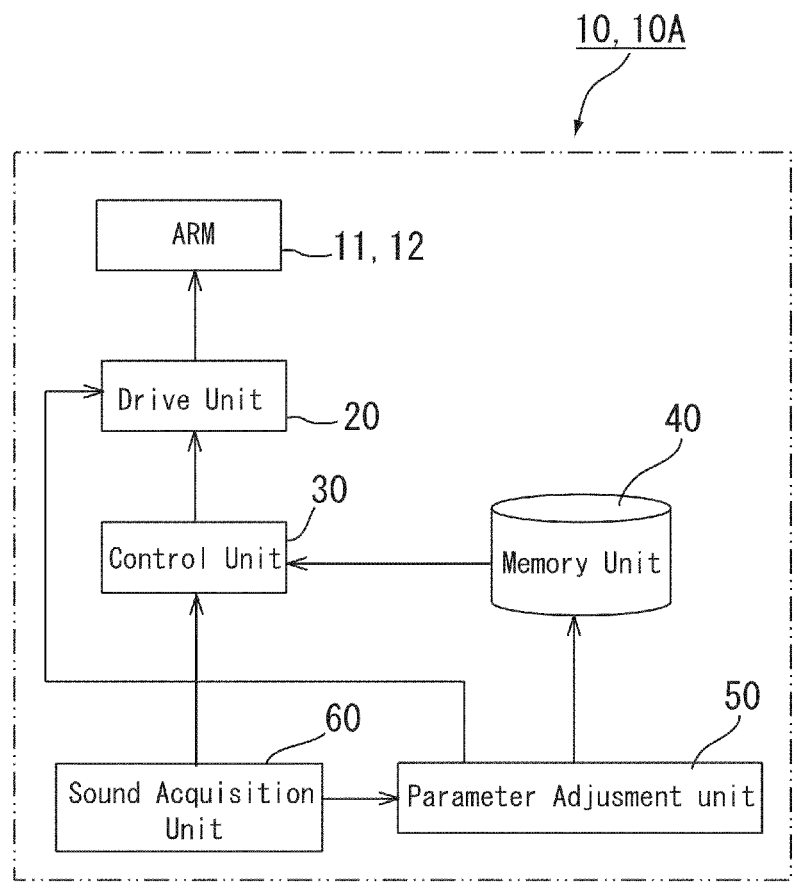
FIG. 3 is a block diagram showing a configuration of the thereminist robot according to the first embodiment of the present invention.

FIG. 3 is a block diagram of the thereminist robot 10 according to the present embodiment. The thereminist robot has the left arm 11 and the right arm 12, a drive unit 20, a control unit 30, a memory unit 40, a parameter adjustment unit 50, and a sound acquisition unit 60.

In the preset embodiment, a freedom degree of the arms 11, 12 is set as 1. The arms are rotatably attached on both ends of an upper part of body as shown in FIG. 2. Specifically, the right arm 12 is rotatably fitted in such manner that the arm 12 is horizontally rotatable around a vertical axis of the robot 10. The arms 11, 12 are formed of, for example, non-insulated material.

The drive unit 20 drives the arms 11 and 12. The drive unit 20 is configures as a joint for joining, for example, the arms 11, 12 with a body 14. This joint comprises a motor for changing a rotation position of, for example, the arm with respect to the body 14. A motor driver for controlling rotation of this motor and a rotation detection unit such as a rotary encoder for detecting a rotation angle are provided though figures are not shown.

The control unit 30 controls the drive unit 20. The control unit 30 is mounted on, for example, the body 14 and configured by an electronic computing device such as a computer. The control unit 30 controls the drive unit 20 for playing the theremin 1 according to musical notes. The thereminist robot 10 moves a position of tip end of the right arm 12 to a desired position in sequence of respective notes so that a required score is played, in other words, thereminist 1 plays pitch sounds corresponding to sequential notes. Here, the control unit 30 is not necessarily mounted on the body 14 but a computer and others provided separately from the thereminist robot 10 through a cable may be employed as a matter of fact.

For such drive-control, the control unit 30 performs a process described below.

The control unit 30 converts inputted score information, or respective notes arranged in sequence, into respective arm positions $x_p$ based on the above-described formula (2) of inverse model.

The control unit 30 moves the right arm 12 to obtained target arm position $x_p$. In other words, the control unit 30 moves a position of hand of the arm 12 to the target arm position $x_p$. The control unit 30 calculates a rotation control rate required for the motor to move, for example, the arm 12 to the target arm position $x_p$. Hereinafter, this process is referred to as conversion process. In this conversion process, information including a current rotation position of the motor obtained from the rotation position detection unit and others is used as a reference. Based on this rotation control rate, the motor driver controls the motor. Such controls are sequentially carried out to the respective notes.

The memory unit 40 comprises information of environmental parameter and information of subject scores to be played when the control unit 30 performs the conversion process.

The sound acquisition unit 60 acquires sounds emitted from the theremin 1. In the present embodiment, a microphone is employed as the sound acquisition unit 60.

The parameter adjustment unit 50 calibrates an environmental parameter $\theta_0, \theta_1, \theta_2, \theta_3$ configuring a pitch model before the thereminist robot 10 plays, so that the pitch model suitable for the playing environment can be used during playing.

Figure 4:
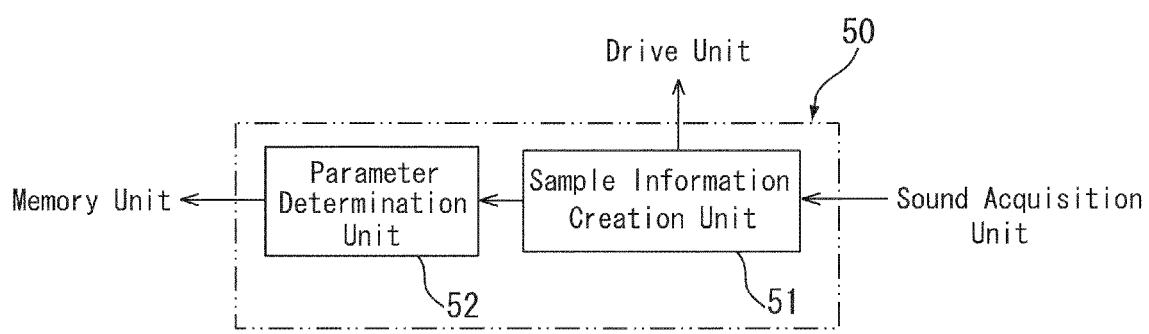
FIG. 4 is a block diagram showing a configuration of a parameter adjustment unit according to the first embodiment of the present invention.

Therefore, the parameter adjustment unit 50 comprises a sample information creation unit 51 and a parameter determination unit 52 as shown in FIG. 4.

The sample information creation unit 51 sets a pitch at $M_p$ when the pitch arm 12 is located in a position $x_p$, and creates data of a pair of position $x_p$ and pitch $p(=M_p)$ as sampling information. The sample information creation unit 51 controls the drive unit 20 and changes a position of the pitch arm 12 for acquiring the pitch respectively in plural arm positions.

The parameter determination unit 52 determines the environmental parameter $\theta_0, \theta_1, \theta_2, \theta_3$ based on plural pieces of sampling information that are created in the sampling information creation unit 51.

Calibration of the environmental parameter $\theta_0, \theta_1, \theta_2, \theta_3$ in the parameter adjustment unit 50 is explained.

Pitches of the theremin 1 corresponding to pitch arm position $x_p=(x_{p0} \ldots x_{pN})$ at a portion of (N+1) are represented by $p=(p_0, \ldots, P_N)$. Because the pitch model of the formula (1) is a nonlinear monotone increasing function, the environmental parameter is obtained from an evaluation function shown in the next formula (3), for obtaining a joint angle corresponding to a desired pitch. Specifically, a parameter $\theta$ for minimizing $L^2$ norm of the evaluation function is obtained.

[Formula 3]

$$f(x_p, p; \theta) = (f_0(x_{p0}, p_0, \theta), \ldots, f_{N+1}(x_{pN}, p_N, \theta))^T \text{ where}$$
$$f_i(x_{pi}, p_i, \theta) = p_i - M_p(x_{pi}, \theta) \quad (3)$$

Optimum parameter $\theta^*$ is expressed by the following formula.

[Formula 4]

$$\theta^* = \underset{\theta}{\operatorname{argmin}}(\|f(x_p, p; \theta)\|^2) \quad (4)$$

In the present embodiment, the optimization problem is solved using a Levenberg-Marquardt method (hereinafter referred to as LM method) that is shown in, for example, non-patent literature 16 and others. The LM method updates parameters according to the next formula.

[Formula 5]

$$\theta^{new} = \theta^{old} - (J^T J + \mu I)^{-1} J^T f(x_p, p; \theta^{old}) \quad (5)$$

where $\mu$ is a learning parameter that is automatically determined based on an error between learning data and an estimate value by the pitch model, I is a unit matrix, and J is a Jacobi matrix of the evaluation function shown in the following formula.

[Formula 6]

$$(J(\theta))_{ij} = \frac{\partial f_i}{\partial \theta_j} \quad (6)$$
$$(i = 0, \ldots, N, j = 0, \ldots, 3)$$

Respective elements of the Jacobi matrix are partial differential and expressed in the following formula.

[Formula 7]

$$\begin{cases} \frac{\partial f_i}{\partial \theta_0} = -\theta_1 \theta_2 (\theta_0 - x_i)^{-(\theta_1 - 1)}, \\ \frac{\partial f_i}{\partial \theta_1} = \theta_2 (\theta_0 - x_i)^{-\theta_1} \log(\theta_0 - x_i), \\ \frac{\partial f_i}{\partial \theta_2} = -\frac{1}{(\theta_0 x_i)^{\theta_1}}, \\ \frac{\partial f_i}{\partial \theta_3} = -1. \end{cases} \quad (7)$$

Here, an appropriate parameter is estimated by providing $\theta$ with an appropriate initial value. The parameter adjusting unit 50 registers thus obtained environmental parameter $\theta_0, \theta_1, \theta_2, \theta_3$ in the memory unit 40.

Such the control unit 30 and the parameter adjustment unit 50 are configured by, for example, a computer. This computer realizes above-described two modes, in other words, a calibration phase and a playing phase by executing a program as software installed in advance. Specifically, the computer executes the program to cause the computer to function as the control unit 30 and the parameter adjustment unit 50. Here, those downloaded through a communication line and those memorized in the memory medium including CD-ROM, DVD-ROM, and a mobile memory device are used for the program.

Here, plural computers are interconnected through LAN, internet, public network, and others and operation of the control unit 30 and the parameter adjustment unit 50 may be distributedly processed by plural personal computers. The computer of conventional configuration may be used and comprises a memory unit such as RAM, ROM, and hard disk, a operation unit such as keyboard, and pointing device, a central processing unit (CPU) for processing data and software saved in the memory unit according to an instruction from the operation unit and others, and a display for displaying processed result and others. This computer may be for general use or configured as a device for special use.

D. Operation of Thereminist Robot

Hereinafter, the calibration phase and the playing phase are explained.

D-1. Operation of Calibration Phase

Figure 5:
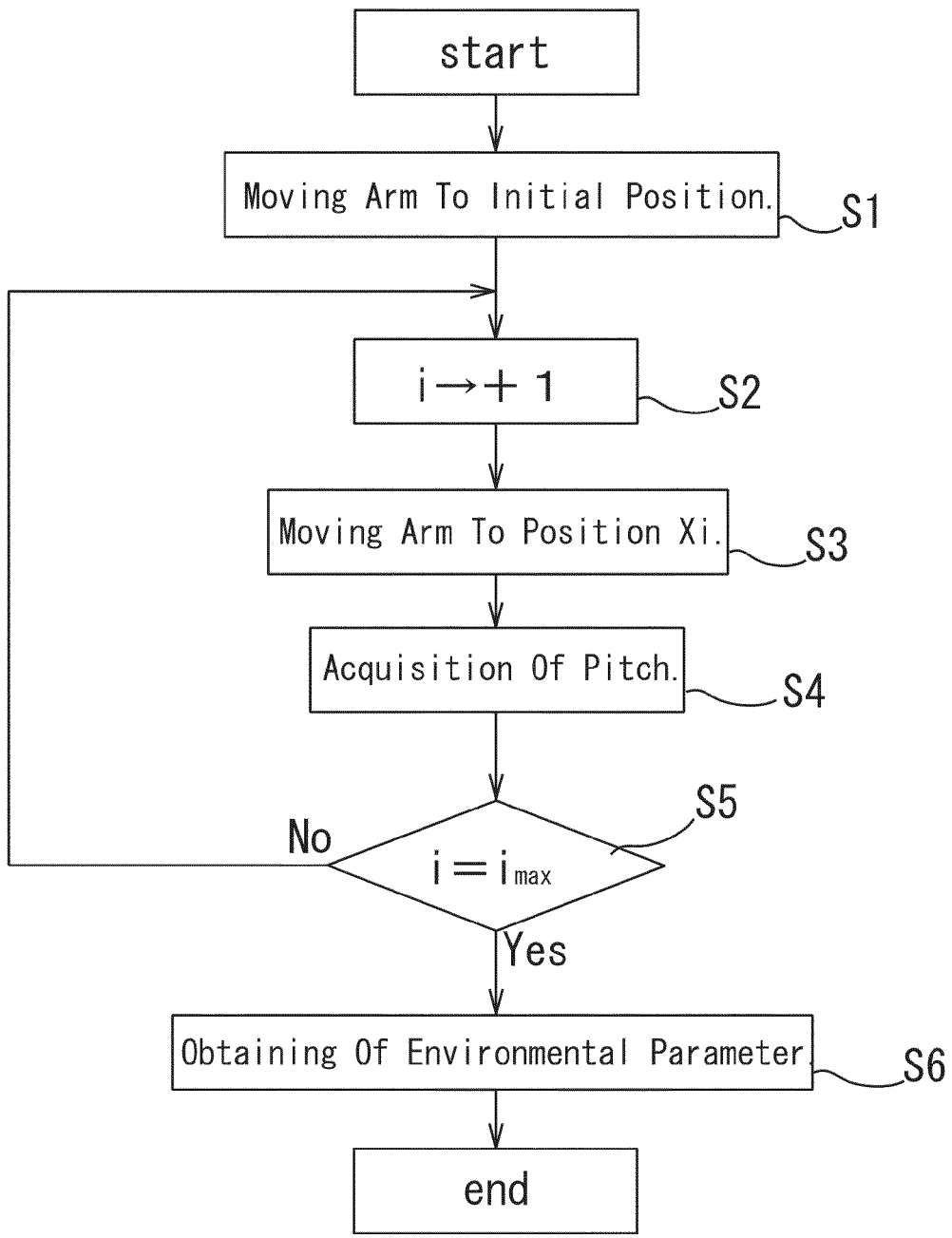
FIG. 5 is a flowchart of a calibration phase of the thereminist robot according to the first embodiment of the present invention.

FIG. 5 is used for explanation. The environmental parameter is adjusted to accept an environment of playing site before the robot 10 plays.

First, the pitch arm 12 is moved to the initial position (Step S1). For example, an arm-end position in a state that the right arm 12 extends to a right direction of the body 14 as shown by a solid line in FIG. 2 is represented by $x_0$. An arm-end position in a state that the right arm 12 extends forward of the body 14 as shown by a broken line in FIG. 2 is represented by $x_N$. Positions dividing a distance between these end points $x_0, x_N$ into N equal parts are sample acquisition positions. Here, if the respective arm positions are $x_i$ (i=0, . . . , N), $X_0$ of a position number i=0 is an initial position.

The right arm 12 is moved to the initial position $x_0$ to acquire a pitch of sound emitted from the theremin 1 at the arm position and record the sample information being formed by a pair of position $X_0$ and pitch, for example in the record unit 40.

When the sample information acquirement is completed, the position number i is incremented (Step S2) and then the arm is moved to the arm position $x_{i+1}$ (Step S3). Similarly to the former, the pitch of sound in the arm position of $x_{i+1}$ is acquired and recorded in the record unit 40 as the sampling information (Step S4).

Next, it is judged whether the position number i is a maximum number, in other words, N (Step S5). If it is not (in a case of NO in Step S5), increment of the position number i and the pitch acquisition in an update position are repeated until the position number i is maximum number, in other words, until Yes is obtained in Step S5.

The parameter adjustment unit 50 calculates the environmental parameter $\theta_0, \theta_1, \theta_2, \theta_3$ based on thus obtained $p=(P_0, \ldots P_N)$ being the theremin pitch corresponding to $x_p=(x_{p0}, \ldots, x_{pN})$ being the pitch arm position of the portion of (N+1) and the above described formulas (2) to (7) (Step S6).

D-2. Operation of Playing Phase

Figure 6:
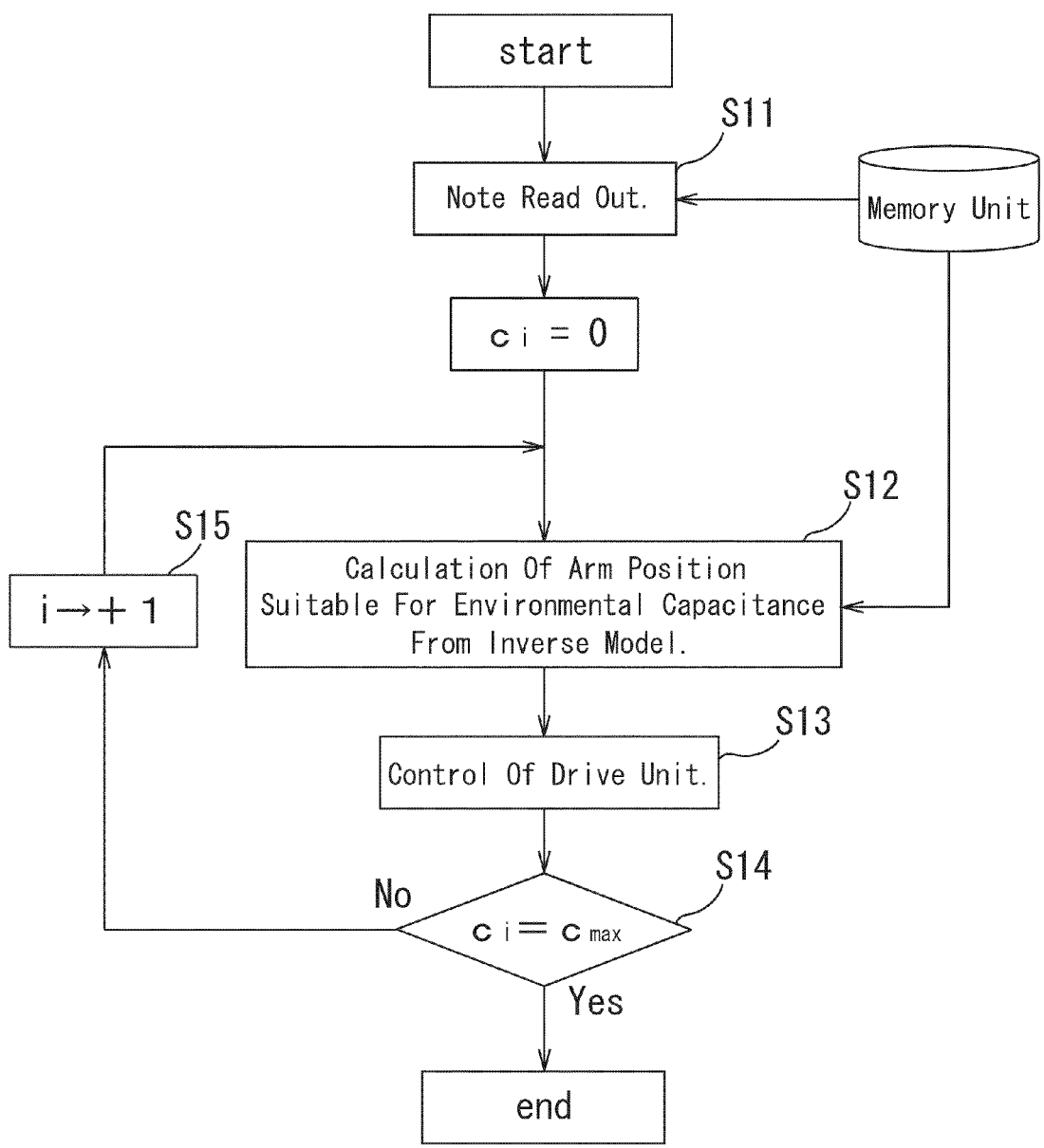
FIG. 6 is a flowchart of a playing phase of the thereminist robot according to the first embodiment of the present invention.

FIG. 6 is used for explanation.

First, the control unit 30 reads out information of score from the memory unit 40 (Step S11). The control unit 30 carries out the following process in order of note numbers, where plural note numbers arranged in order of the score are $C_i$ (i=0, . . . , N).

The control unit 30 carries out pitch control so that the pitch corresponds to the note number $C_0$ is performed (Step S12). A target of the pitch control is to obtain a position of the pitch arm 12 for outputting a target pitch line. The target pitch line is obtained by transforming a note of provided score to a pitch based on temperament. When a certain note n (C=0, C#=1, . . . , Bb=10, B=11) and octave O (O=integral number) are given, a corresponding pitch p based on the temperament is represented by the following formula.

[Formula 8]

$$p = 440 \cdot 2^{(o-4)} \cdot 12\sqrt{2^{n-9}} \quad (8)$$

The control unit 30 obtains the target arm-position $x_R$ by substituting the pitch p obtained by the formula (8) and the environmental parameter $\theta_0, \theta_1, \theta_2, \theta_3$ adjusted by the calibration phase into the above-described inverse model formula (2).

The control unit 30 controls the drive unit 20 so that the pitch arm 12 is moved to the position $x_R$ (Step S13). Thus, the desired sound corresponding to the score note is played from the theremin 1 at the desired pitch by moving the pitch arm 12 to the position $X_R$.

Here, in the present embodiment, playing time of respective notes is set at a certain time. The control unit 30 judges whether or not the playing time of respective notes ends. In a case where it is judged that the time ends, the robot proceeds to a step of playing the next note.

During playing the respective notes, the control unit 30 adjusts the position of right arm 12 based on PID control so that the pitch is maintained at the target value based on the pitch of sound actually emitted from the theremin 1. For such the PID control, the control unit 30 acquires the playing sound of the theremin 1 from the sound acquisition unit 60.

Next, it is judged whether or not the note number i is the maximum number, or N (Step S14). If it is not appropriate (in a case of No in Step S14), increment of the note number i (Step S15) and the pitch control corresponding to the note are repeated until they become appropriate, in other words, until it is judged YES in Step S14.

According to the thereminist robot 10 of the present embodiment, by adjusting the position of the right arm 12 to the pitch antenna 6 of the theremin 1, it is possible to play so that the pitch sounds corresponding to the desired notes are played from the theremin 1 regardless of the state of the theremin 1 that is affected by the environment surrounding the robot, in other words, electromagnetic field of the playing place.

In the pitch control method of the present embodiment, the theremin pitch as in non-patent literature 15 is not a subject to be searched but treated as learning data for parameter estimation. Therefore, the pitch not used for the learning data is appropriately complemented. Accordingly, it is possible to output arbitrary pitch by using a few data as learning date, too.

In the present embodiment, it is assumed that the environmental capacitance does not change after the calibration. However, the assumption is approximately satisfied by carrying out the calibration regularly if change is moderate. Therefore, calibration time is required to be short and the calibration is carried out often. Therefore, in the present embodiment, the number of measurement points that takes time for building up the model is limited as much as possible.

E. Second Embodiment

A sound volume (hereinafter referred to as volume) of the theremin 1 increases or decreases by changing a position of the left arm 11 (hereinafter referred to as volume arm in some cases) as a second arm with respect to the volume antenna 7 (ref. to FIG. 2). However, this volume cannot be controlled independently of the pitch control. The volume is affected by the pitch arm 12 and changes depending on the position of the pitch arm 12 as well.

In the robot 10 according to the first embodiment, the volume changes under influence of the right arm 12 accompanied with the pitch control.

Then, a robot 10A according to a second embodiment is configured to be volume-controllable in addition to pitch-controllable.

Therefore, the thereminist robot 10A according to the present embodiment is further provided with a model for representing volume characteristic related to loudness of the sound at respective end positions of the left arm 11 and the right arm 12 in response to the environmental capacitance. Hereinafter, this model is referred to as volume model.

Figure 7:
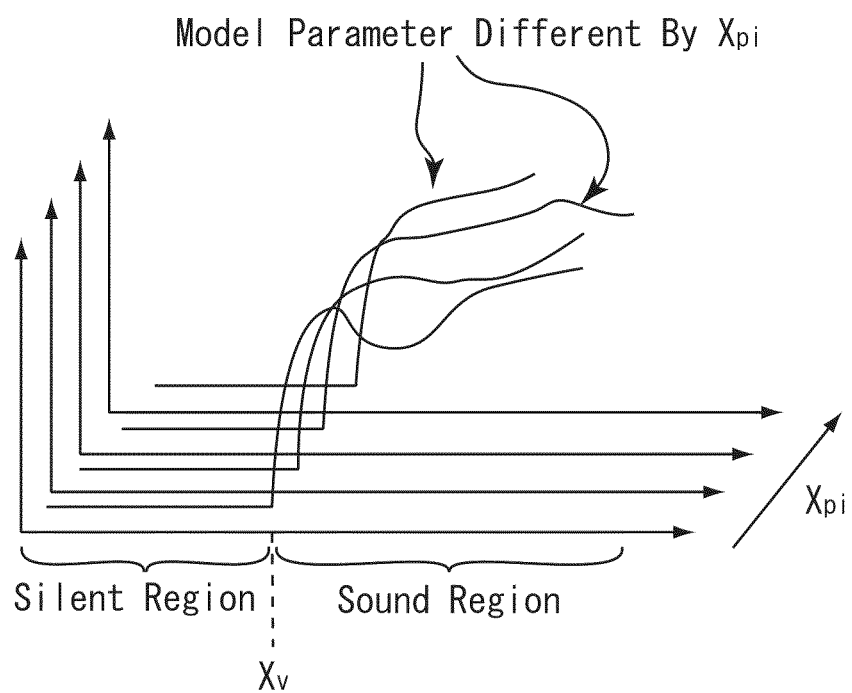
FIG. 7 is a conceptual diagram of a volume model.

This volume model has a position of the pitch arm 12 as a variable, in addition to a position of the volume arm 11 and an environmental capacitance. Further, the volume characteristic has following two features:

(Feature 1) There are a silent region where the volume arm 11 is satisfactorily near to the volume antenna 7 and the other sound region (ref. to FIG. 7).

(Feature 2) Most of the respective volume variances have one or two peaks based on the volume characteristic in every position of the pitch arm 12.

In the present embodiment, the volume characteristic is modeled by a polynomial having different parameters by positions of the pitch arm 12 as the following formula.

[Formula 9]

$$v = M_v(x_v, x_p; a(x_p), b(x_v)) = \begin{cases} \sum_{n=0}^{d} a_n(x_p) x_v^n & (b(x_p) < x_v) \\ v_{min} & (\text{otherwise}) \end{cases} \quad (9)$$

where v represents a volume estimated by the volume model, $a(x_p)=(a_n(x_p), \ldots, a_0(x_p))$ is a coefficient of the polynomial model of sound region, d is a dimension of the polynomial, $b(x_p)$ is $x_v$ being a boundary between the silent region and the sound region, and $v_{min}$ is a background noise being a volume in the silent region.

The volume model has three types of parameters of $a(x_p)$, $b(x_p)$, and $v_{min}$ that are different by positions of the pitch arm 12 as shown in the conceptual diagram of FIG. 7. Therefore, if the dimension of the polynomial of Formula 9 is d and a range of motion of the pitch arm is divided into N equal pieces, a total parameter number is (1+1+d)N. Here, there are problems that the characteristic cannot be presented if the dimension d of the polynomial is too low, and excessive adaptation and required data increase if it is too high. In the present embodiment, d=4 is used based on the preliminary experiment.

For playing the theremin, the thereminist robot 10A does not use the above described volume model but uses its inverse model. In other words, in a playing step, parameters specified in response to the environment, or the above-described $a(x_p)$, $b(x_p)$, and $v_{min}$ are adjusted by the calibration described later, and $x_v$, a position of the left arm 11 is obtained from the inverse model of the above-described formula (9) for obtaining a target volume. The inverse model of volume model is represented as the following formula.

[Formula 10]

$$M_v^{-1}(v; a(x_{pi}), b(x_{pi})) = \begin{cases} v_{min} & (v < v_{min}) \\ \hat{x}_v & (\text{otherwise}) \end{cases} \quad (10)$$

This formula is for transforming the volume into the target position $x_L$ of the volume arm 11.

The thereminist robot 10A according to the present embodiment calibrates the model parameters $a(x_p)$, $b(x_p)$, and $v_{min}$ for utilizing the inverse model of the volume model suitable for a usage environmental. As a calibration process, respective environmental parameters of the volume model and the pitch model are adjusted in the present embodiment.

The parameter adjustment unit 50 carries out this calibration process.

Explanation of the calibration of the pitch model is omitted because it is described in the first embodiment.

The sample information creation unit 51 of the parameter adjustment unit 50 creates data as sampling information, where a volume v at the position $x_v$ of the volume arm 11 in a state that the pitch arm 12 is fixed to the position $x_p$ is in a pair. The sampling information creation unit 51 controls the drive unit 20 to change the position of the left arm 11 for acquiring the volume at plural positions of the volume arm 11.

The parameter adjustment unit 50 estimates the environmental parameters $a(x_p)$, $b(x_p)$, and $v_{min}$ based on plural pieces of the sampling information thus created in the sampling unit.

Here, as shown in FIG. 7, because the model parameters change as the position $x_{pi}$ of the pitch arm 12 changes, the environmental parameters $a(x_{pi})$, $b(x_{pi})$, and $v_{min}$ are estimated at every respective positions $x_{pi}$ of the pitch arm 12.

Here, calibration of the environmental parameters $a(x_p)$, $b(x_p)$, and $v_{min}$ in the parameter adjustment unit 50 is explained.

With respect to coefficient $a(x_{pi})$ of the sound portion of the polynomial model, the position $x_{pi}$ of the pitch arm is fixed, the formula is created by substituting respective positions $x_{vi}$ of volume arm and the volume $v_{ij}$ at its positions into the above-described volume model (Formula 9), and further the similar formula is created by changing the position $x_{vj}$ of the volume arm. Following plural simultaneous equations are prepared as follows.

[Formula 11]

$$\begin{cases} a_d(x_{pi}) x_{v0}^d + \ldots + a_1(x_{pi}) x_{v0} + a_0(x_{pi}) = v_{i0} \\ \vdots \\ a_d(x_{pi}) x_{vM}^d + \ldots + a_1(x_{pi}) x_{vM} + a_0(x_{pi}) = v_{i(M+1)} \end{cases} \quad (11)$$

The above-described simultaneous equations are solved and the parameters $a(x_{pi})$ can be obtained.

Next, in the second parameter $b(x_p)$, the maximum value of the arm position is set as $b(x_{pi})$ under the condition that the volume is lower than a threshold value $T_{th}$, because the volume tends to increase as the position $x_{vj}$ of the volume arm becomes larger, in other words, farther from the antenna. Accordingly, $b(x_{pi})$ is obtained by the following formula.

[Formula 12]

$$b(x_{pi}) = \max_{j \in \{j | v_{ij} < T_{th}\}} x_{vj} \quad (12)$$

The parameter $v_{min}$ may be a volume at the time of no volume.

The control unit 30 of the present embodiment controls so that the left arm 11 is moved to the position obtained from the inverse model of volume model during performance. The theremin is provided with a tab for adjusting the volume, and the control unit 30 controls so that the sound emitted from the theremin 1 is played at the volume the user operates with the tab.

F. Operation of Second Embodiment

Hereinafter, a calibration phase and a playing phase are explained.

F-1. Operation of Calibration Phase

In the calibration phase of the robot 10A according to the present embodiment, the parameters $a(x_p)$, $b(x_p)$, and $v_{min}$ of the volume model are adjusted in addition to the adjustment of the environmental parameters $\theta_0, \theta_1, \theta_2, \theta_3$ of the above-described pitch model. The adjustment of environmental parameters $\theta_0, \theta_1, \theta_2, \theta_3$ is omitted here because it is similar to the above-description.

Figure 8:
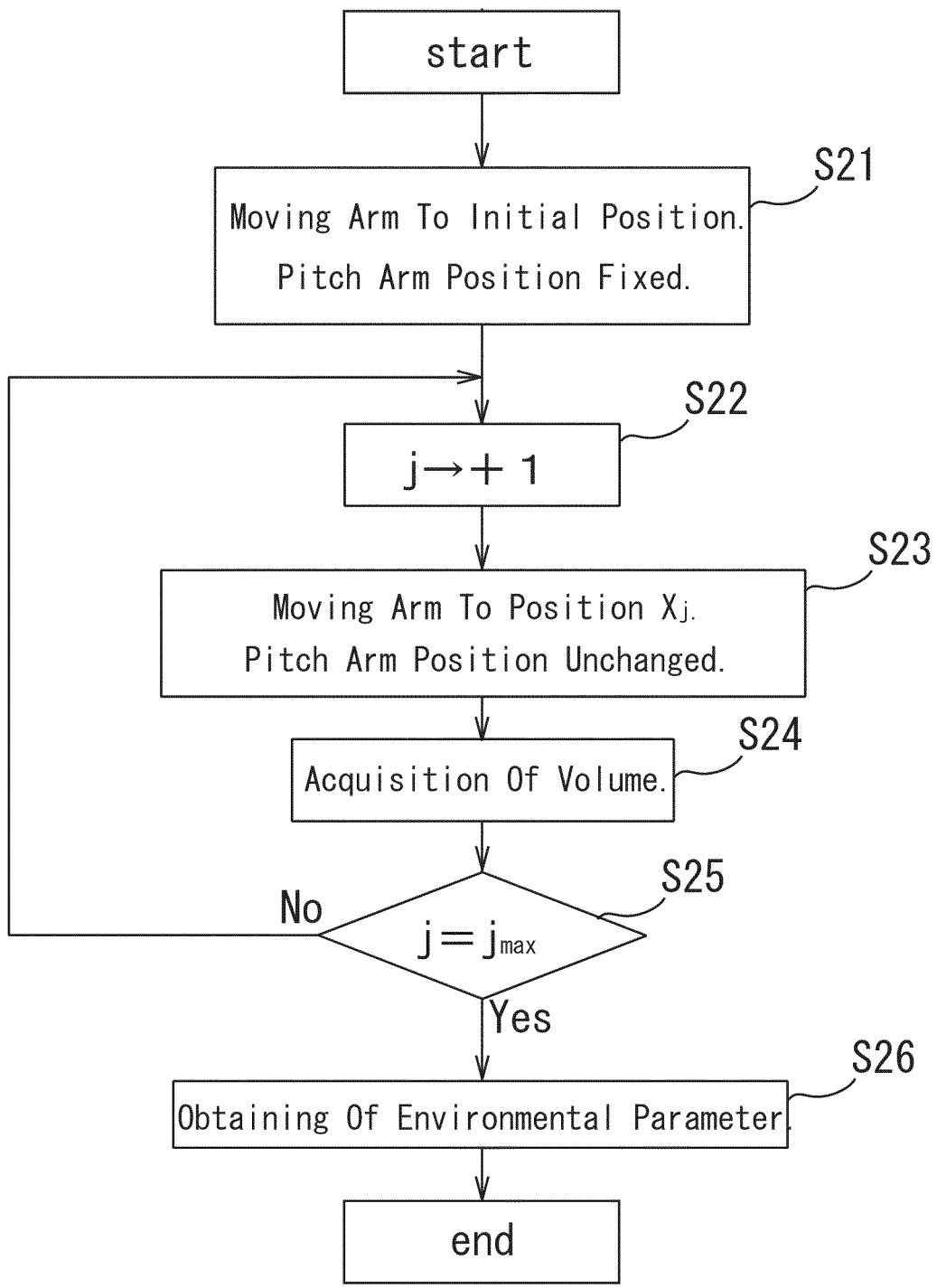
FIG. 8 is a flowchart of a calibration phase of a thereminist robot according to a second embodiment of the present invention.

Hereinafter, the adjustment of the parameters $a(x_p)$, $b(x_p)$, and $v_{min}$ of the volume model is explained based on FIG. 8.

This adjustment is carried out to adapt to the environment of the playing site before the robot 10A plays similarly to the adjustment of the environmental parameters $\theta_0, \theta_1, \theta_2, \theta_3$ of the pitch mode.

Figure 9:
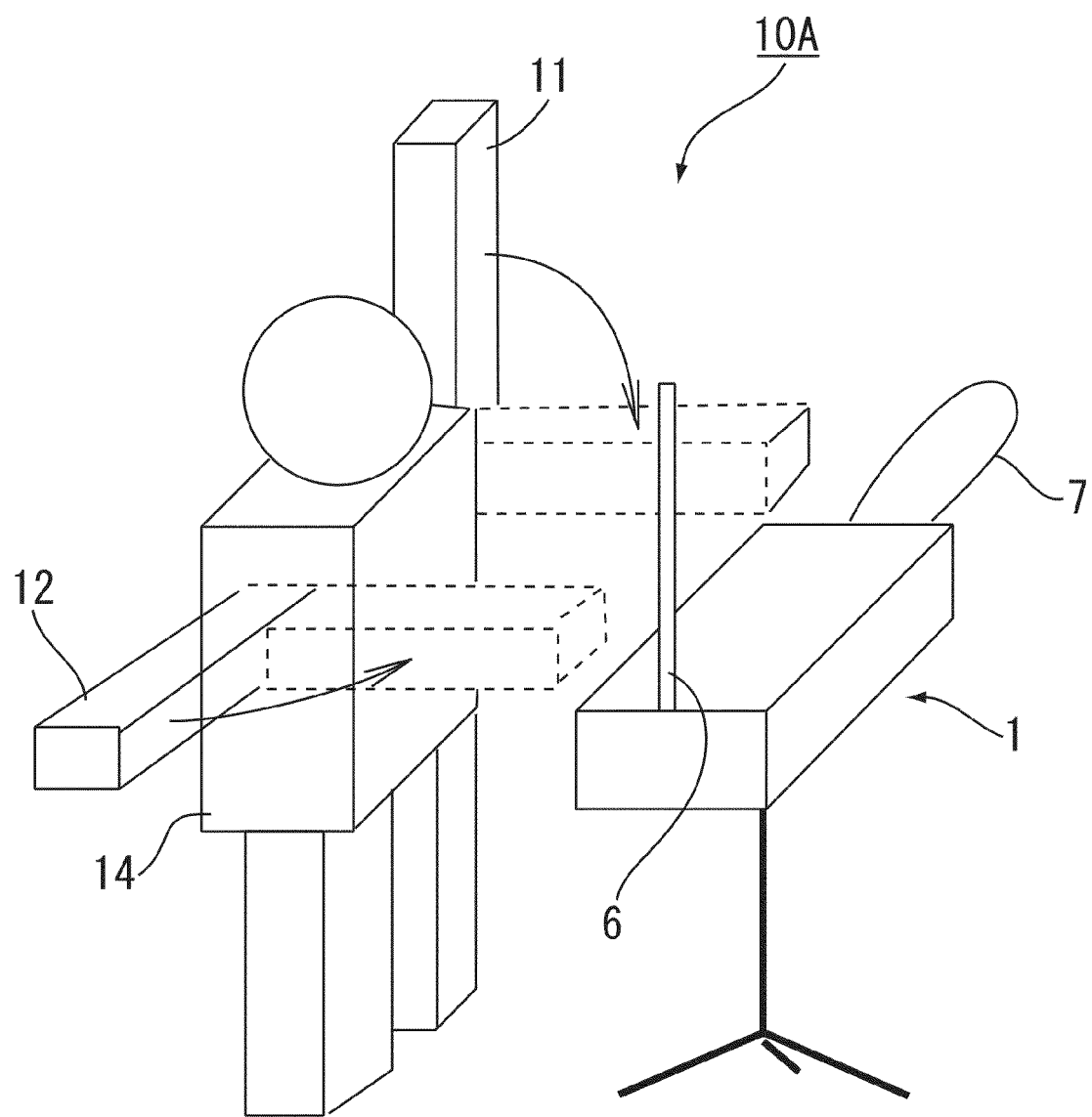
FIG. 9 is a schematic perspective diagram of the thereminist robot according to the first embodiment of the present invention.

First, the volume arm 11 is moved to an initial position. An arm-end position in a state that the left arm 11 extends upward as shown, for example, by a solid line in FIG. 9 is denoted by $x_{v0}$. As shown by a broken line in FIG. 9, an arm-end position in a state that the left arm 11 extends forward of the body 14 is denoted by $x_{vN}$. Positions where a distance between the both end points, $x_{v0}$, $x_{vN}$ is divided into N equal pieces are sample acquisition positions. Here, if respective arm positions are $x_{vj}$(j=0, . . . , N), $x_{v0}$ of position number j=0 is defined as an initial position.

The left arm 11 is moved to the initial position $x_{v0}$, and the volume of sound emitted from the theremin 1 at the arm position thereof is acquired and recorded as sample information consisting of a pair of position and volume in, for example, the memory unit 40 (Step S21). Here the right arm 12 is fixed at a given position.

After completion of acquirement of the sample information, the position number j is incremented (Step S22), and then the arm is moved to the arm position $x_{j+1}$ (Step S23). Here, the right arm 12 is not moved. Then, the volume of sound at the arm position $X_{j+1}$ is acquired and recorded as sampling information in the record unit 40, similarly to the previous time (Step S24).

Next, it is judged whether or not the position number j is the maximum number, or N (Step S25). If it is not (in a case of judgment NO in Step S25), increment of the position number j and the volume acquisition at the position thereof are repeated until it becomes appropriate, in other words until Yes is judged in Step S25.

The parameter adjustment unit 50 calculates the environmental parameter $a(x_p)$ based on the formula (11) and the pitch v=($v_0$, . . . , $v_N$) corresponding to the pitch arm position $x_v$=($x_{vi}$, . . . , $x_{vN}$) of the theremin 1 at the portion (N+1) (Step S26). Further, $b(x_p)$ is obtained base on the formula (12) and $v_{min}$ is defined as a volume at the time of no sound.

Such the adjustment process of the environmental parameters $a(x_p)$, $b(x_p)$, and $v_{min}$ of volume model may be carried out in parallel with the adjustment process of the environmental parameters $\theta_0, \theta_1, \theta_2, \theta_3$ of pitch model, or before or after thereof.

F-2. Operation of Playing Phase

FIG. 6 is used for explanation

First, the control unit 30 reads out information of musical score from the memory unit 40 (Step S11).

Here, numbers of plural musical notes arranged in order of score are expressed by $C_i$ (i=0, . . . , N). The control unit 30 carries out the following process in order of the note number.

The control unit 30 controls the pitch so that the pitch corresponds to the note number $C_0$. Specifically, a target position $x_R$ of the right arm is obtained by substituting the pitch p obtained by the formula (8) and the environmental parameters $\theta_0, \theta_1, \theta_2, \theta_3$ adjusted in the calibration phase into the inverse model formula (2) of pitch model described above (Step S12).

In addition to such the pitch control, volume control is carried out in the present embodiment. The control unit 30 obtains a target position $x_L$ of the left arm by substituting the volume v set in the theremin 1, the position $x_R$ of the right arm obtained by the pitch control, and the environmental parameters $a(x_p)$, $b(x_p)$, and $v_{min}$ estimated related to the position of right arm in the calibration phase into the inverse formula (10) of the volume model described above (Step S12). Here, if the target volume is lower than $v_{min}$, the position of the volume arm is set at $b(x_p)$. If it is higher than that, the position of the volume arm 11 is estimated by solving the polynomial $a_{n-1}x^{n-1}+ \ldots +a_1 x_v + a_0 = v$. If $x_p$ is between measured positions, the volume arm positions are obtained respectively from the both pitch arm positions for linear interpolation.

The control unit 30 moves the right arm 12 to the position $x_R$ and moves the left arm 11 to the position $x_L$ (Step S13). Accordingly, the sounds corresponding to names of the musical notes are played at the set volume.

Here, in the present embodiment, playing time of respective notes is preset at a given time. The control unit 30 judges whether or not the playing time of respective notes ends. If the control unit 30 judges the time ends, it starts a playing process of the next note.

During playing respective notes, the control unit 30 adjusts the position $x_R$ of the right arm 12 and the position $X_L$ of the left arm 11 based on PID control so that the pitch and the volume are maintained at the target value based on the pitch actually emitted from the theremin 1 and the volume actually emitted from the theremin 1. For such the PID control, the control unit 30 acquires performance sounds of the theremin 1 from the sound acquisition unit 60.

Next, the control unit 30 judges whether or not the note number i is the maximum number, or N (Step S14). If it is not (in a case of judgment No in Step S14), increment of the note number i (Step S15) and the pitch control in response to the name are repeated until it is appropriate, or Yes is obtained in Step S14.

Thus, according to the thereminist robot 10A of the present embodiment, the position of the right arm 12 toward the pitch antenna 6 of the theremin 1 is adjusted, and the position of the left arm 11 toward the volume antenna 7 that is affected by the right arm 12 is adjusted as well. Therefore, it is possible to play the theremin 1 at the pitch corresponding to note and the desired volume regardless of a state of the theremin 1 that is affected by the environment surrounding the robot, in other words, the electromagnetic field of the playing site.

The pitch model and the volume model of the present embodiment models only characteristics of the theremin 1 but does not include physical restriction of the robot. Therefore, because the pitch control and the volume control of the present embodiment are separated into portions dependent on and independent of a hardware of the robot, only the portion dependent on the robot is replaced in a case that it is desired to be mounted on the other robot.

G. Comparative Example of Model

A comparative example of model is explained.

Because, related with the present model, a physical model of an environmental capacitance of the theremin is proposed in non-patent literature 18, the model of the non-patent literature 18 is described for comparison.

According to the non-patent literature 18, the environmental capacitance is expressed by sum of an electrostatic capacitance when a pitch arm position is x and an electrostatic capacitance when the pitch arm position x is at infinity. Further, the electrostatic capacitance exponentially increases with respect to a distance between an arm and an antenna in the model. An approach of modeling the electrostatic capacitance is general, but a subject is a specific simplified theremin A problem of more simplified one than the commercial theremin generally distributed is dealt with. Actually, in a case of the commercial theremin, an increase speed and an index function are different by the environmental capacitance from a result of the preliminary experiment. Therefore, in a problem related with the present embodiment, where general theremin including peripheral circuits is played, the way of increasing is required to be variable. Therefore, for controlling the an increase speed and linearity, the pitch model of the present embodiment is configured as a model in which an index and coefficient are expressed by parameters $\theta_1, \theta 2$ and a way of optimal increase is expressed.

H. Evaluation Experiment of Pitch Model and Volume Model

Next, four kinds of evaluation experiment on the pitch model and volume model of the theremin is described. In Experiment 1, the number of the learning samples required for parameter estimation of the pitch model is defined. In Experiment 2, a model error between different environments is evaluated for evaluating robustness with respect to environmental variation of the pitch model. In Experiment 3, the present volume control method is evaluated using a task of changing the pitch while keeping a given volume constant. Finally in Experiment 4, portability of the present system is demonstrated by mounting the system on three types of robots. As metric of the performance quality of respective robots, a mean square error between a pitch orbit played on the mounted one and a pitch orbit obtained from the musical score is used. Further, the pitch orbit and the error of an amateur thereminist are shown as a reference for discussing these metrics themselves and respective robots are compared with.

[Measurement Condition of Pitch/Volume Characteristics]

Figure 10:
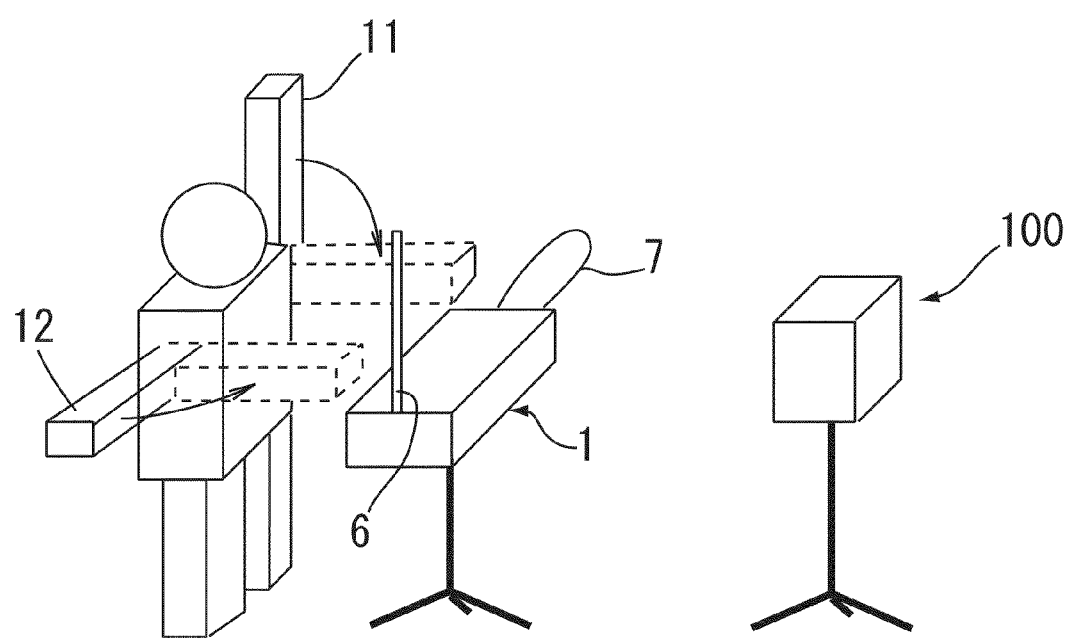
FIG. 10 is a diagram explaining a measurement environment in an experiment.

FIG. 10 shows a schematic diagram of a measurement environment. A humanoid robot HRP-2™ is used for a test head. Etherwave® theremin produced by Moog Music Co. is used for the theremin 1, and the sound of the theremin 1 is recorded with one-channel microphone installed in the head of the robot. As human player, the robot carries out a pitch operation with the right arm 12 and a volume operation with the left arm 11 during playing the theremin 1. Here, a degree of freedom of the both arms is 1, a range of motion of the pitch arm is 90° from the minimum pitch −90° to the maximum pitch 0°. A range of motion of the volume arm is 45° from a maximum volume joint angle −135° to the minimum volume joint angle −90°. A distance between the robot and the theremin 1 is 50 [cm] and a distance between the speaker 100 for reproducing the sound of the theremin and the robot is 150 [cm].

With respect to the pitch characteristic and the volume characteristic of the theremin 1, ranges of motion of the pitch arm and the volume arm are respectively divided into 40 equal pieces, and the sound of theremin is measured for 1 used each on all combinations (41×41=1681) of arm positions in a state that arm position is fixed at 41 points including both ends.

Figure 11:
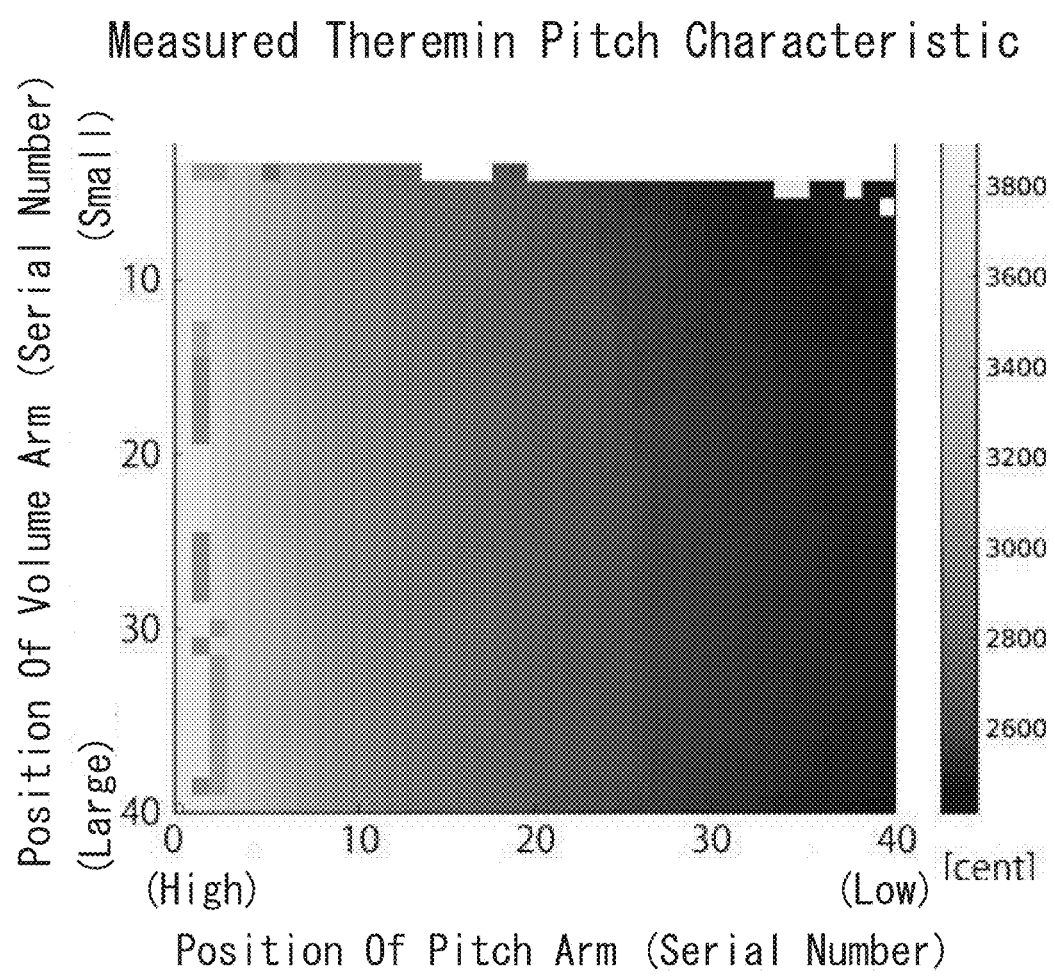
FIG. 11 is a diagram showing a theremin pitch characteristics measured.

Although the pitch characteristic and the volume characteristic of the theremin shown below actually measured change depending on environments, trend described later does not change. First, the pitch characteristic is shown in FIG. 11. A vertical axis represents a volume arm position, and horizontal axis represents a pitch arm position. A method based on autocorrelation disclosed in non-patent literature 19 is used for evaluation of the pitch. Here, a flame width is 42.6 msec (2048 samples) and shift length is 10.6 msec (512 samples), and a central value of a pitch estimation value of respective flames is defined as the pitch at that point. The pitch is expressed by a unit of cent defined by the next formula.

[Formula 13]

$$c[\text{cent}] = 1200 \log_2(f[\text{Hz}]) \quad (13)$$

Figure 12:
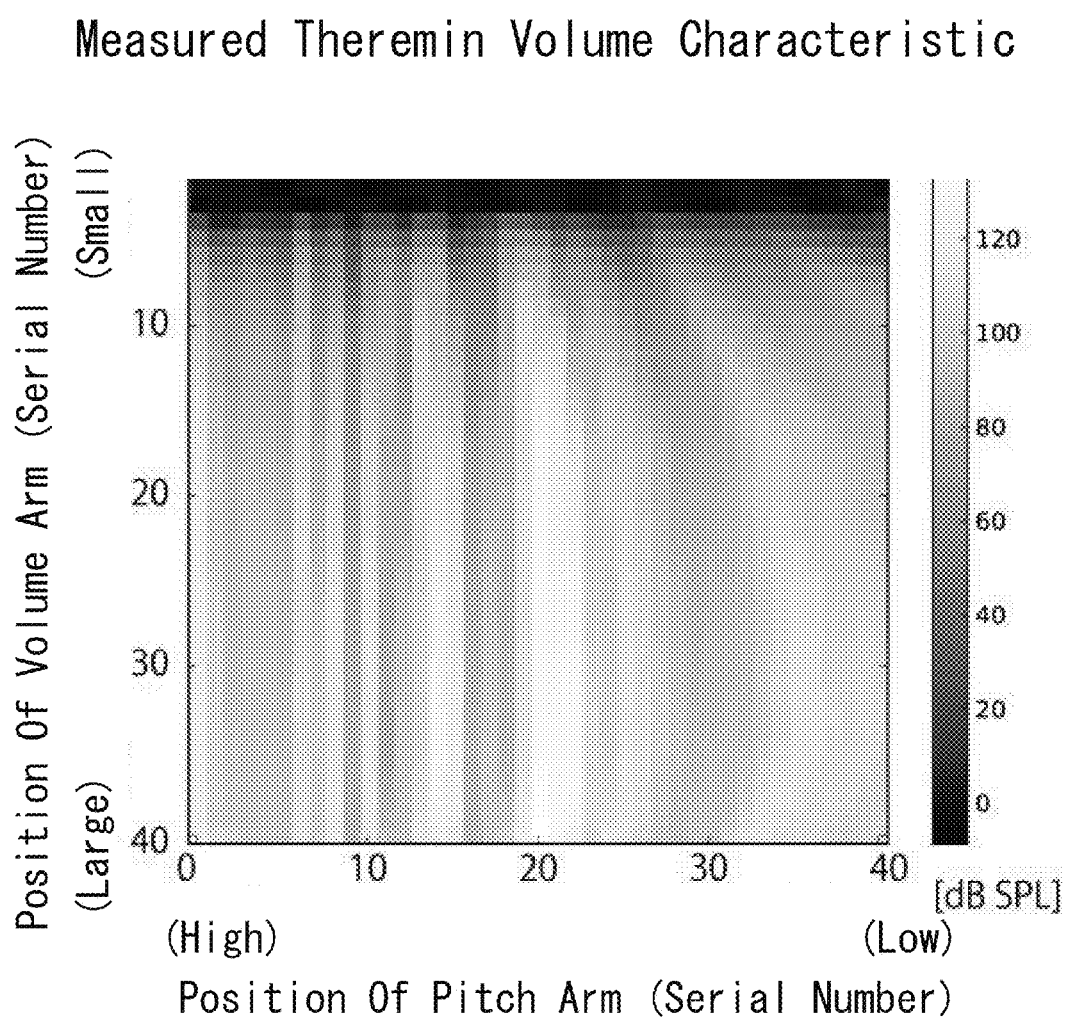
FIG. 12 is a diagram showing a theremin volume characteristics measured.

In FIG. 11, pitches of the upper part are unnaturally high because pitch estimation is failed due to too low volume. FIG. 11 shows that the pitch is higher in leftward side of the figure, where the pitch arm 12 is close to the antenna 6, and the pitch is lower in rightward side of the figure, where the pitch arm 12 is far from the antenna 6. Next, volume characteristic is shown in FIG. 12. A vertical axis represents a position of the volume arm 11 and a horizontal axis represents a position of the pitch arm 12. A sound pressure level [dB,SPL] defined by the following formula using dispersion of the recorded sound is used for a unit of volume.

[Formula 14]

$$v[dBSPL] = 20 \log_{10} \frac{\sqrt{\frac{1}{N} \sum_{t=0}^{N} x(t)^2}}{20 \times 10^{-6}} \quad (14)$$

However, x(t) expresses an output waveform of the theremin 1, and t expresses time. Based on FIG. 12, it is found that the volume is lower in upper part of the figure where the volume arm 11 is closer to the volume antenna 7. It is found that the volume is relatively higher in a lower-half part of the figure where the volume arm 11 is far apart from the volume antenna 7. However, the volume increase is not so simple like the pitch in FIG. 11.

[Experiment 1] Robustness Evaluation of Pitch Model to Change of Learning Sample Number.

In this experiment, the learning sample number required for estimation of the pitch model parameter, in other words, the number N required as a position of the pitch arm 12 is clarified. Adequacy of the estimated parameter is evaluated by the pitch $p_i$ that is measured by respective positions $x_{pi}$ of the pitch arm 12 and a mean absolute error (MAE) of the pitch $M_p(x_{pi}, \theta)$ that is predicted by the pitch model with the estimated parameter $\theta$ substituted. The smaller MAE means that the parameter predicting the measured pitch the more accurately can be estimated. A definition formula of MAE is the following formula (15).

[Formula 15]

$$MAE = \frac{1}{N+1} \sum_{i=0}^{N} |p_i - M_p(x_{pi}, \theta)| \quad (15)$$

Here, the volume arm 11 is no used because only pitch is estimated in the present experiment. Procedures of the estimation is described as follows. First, a range of motion of the pitch arm 12 is divided into 80 equal pieces and 81 points of the pitch of theremin 1 is collected. Then, parameters are estimated using a pair $(p_i, x_{pi})$ of thus collected pitch and the corresponding position of the pitch arm 12. Here, the number of data (N) used for parameter estimation is varied from 5 to 80 and MAE is evaluated. The minimum N where MAE fully decreases is suitable number for this model.

Figure 13:
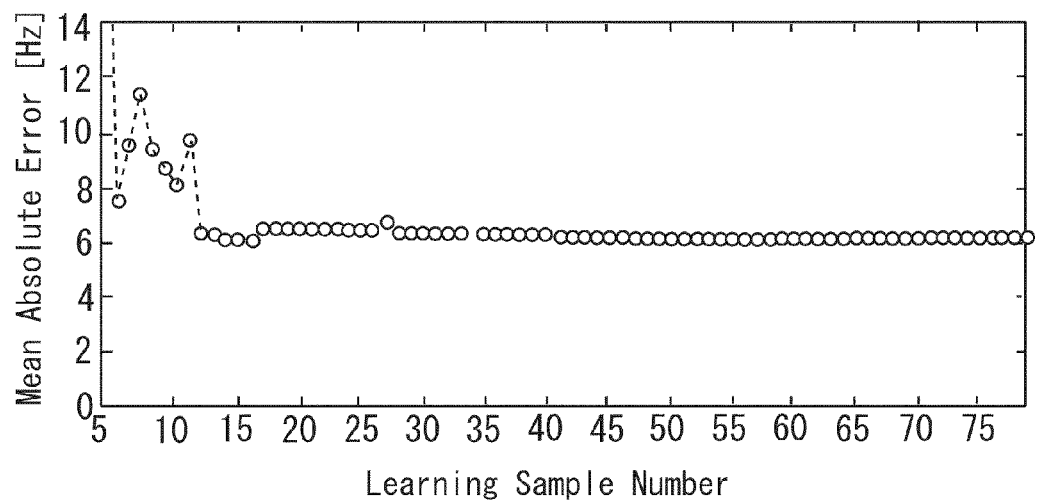
FIG. 13 is a graph showing a result of Experiment 1.

The result is shown in FIG. 13. A horizontal axis represents learning sample number and a vertical axis represents MAE ([$H_z$]). From the figure, MAE decreases when the sample number increases and is colleted in the vicinity of N=12. In a range of N>12, error does not decrease and MAE is saturated at approximately 6 [Hz]. Degree of influence of this error varies depending on the playing pitch. However, because ordinary melody pitch is hundreds [Hz], it is sufficiently low compared with the ordinary melody pitch.

The above result shows that if 12 points are observed for the parameter estimation of the pitch model, it is satisfied. Time in the calibration phase changes depending on types of playing pitch in the non-patent literature 15, while the method according to the present embodiment does not depend on them. Here, in the present experiment, even if moving time of the pitch arm and estimation time of the pitch are included, only 1 to 2 minutes is required to finish because respective points are recorded for 1 second.

[Experiment 2] Evaluation of Robustness of Pitch Model to Environmental Capacitance Changes In the present experiment, accuracy of the pitch model in different pitch characteristics is evaluated by changing the environmental capacitance. Specifically, a metal box is placed near the theremin, the environmental capacitance is artificially caused to change by changing a box position, and parameters are estimated at respective positions. There are four experiment conditions. Condition 0 is a state that there is no box. Condition 1 is a state that the metal box is farthest from the theremin, Condition 2 is a state that the metal box is in the intermediate, Condition 3 is a state that the metal box is closest to the theremin The range of motion of the pitch arm 12 is divided into 20 equal pieces under respective conditions and parameters of the pitch model are estimated by measuring 21 points of pitch.

Figure 14:
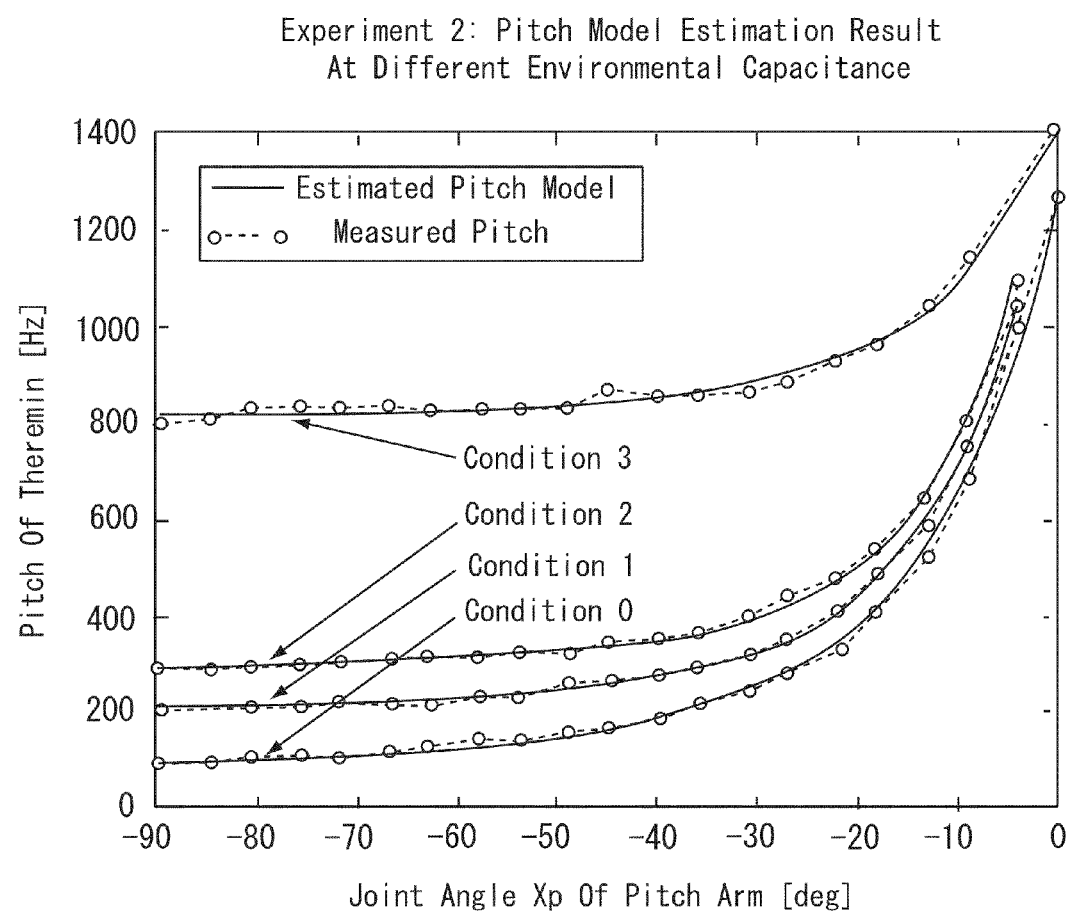
FIG. 14 is a graph showing a result of Experiment 2.

FIG. 14 shows the model thus estimated under the respective conditions. A solid line is a curve of the pitch characteristic drawn by the estimated parameter and points connected by a broken line are pitches actually measured. It is intuitively known that appropriate parameters are estimated, because the points are drawn in the vicinity of the curve. Next, the estimated parameter MAE is shown in Table 1. MAE in the right end column is approximately from 3 [Hz] to 10 [Hz] under the respective conditions and is comparable with the error saturated in Experiment 1. Therefore, this model is considered appropriate.

TABLE 1

EXPERIMENT 2: ESTIMATED PARAMETER

| Condition | $\theta_0$ | $\theta_1$ | $\theta_2$ | $\theta_3$ | MAE |
|---|---|---|---|---|---|
| 0 | 56.78 | 4.65 | $1.70 \times 10^{11}$ | 79.55 | 7.91 |
| 1 | 39.36 | 3.97 | $2.73 \times 10^9$ | 193.0 | 3.05 |
| 2 | 30.20 | 3.42 | $1.44 \times 10^8$ | 279.2 | 3.21 |
| 3 | 71.17 | 5.86 | $4.39 \times 10^{13}$ | 807.2 | 10.7 |

[Experiment 3] Estimation of Volume Control Performance During Pitch Operation

In the present experiment, volume change when the pitch changes while keeping the volume constant, in other words, control error is evaluated. The both characteristics of pitch and volume are measured by dividing the ranges of motion of the both arms respectively into 40 equal pieces and 5 equal pieces (N=41, M=d+1=6, dimension d of the polynomial of volume model is set as 5). Conditions are set by changing position of a tab for volume adjustment of the theremin 1. This is because a tab for volume adjustment is used to remarkably change only the volume characteristic. The characteristic is measured by following three conditions. Condition 1 is that the volume is low, Condition 3 is that the volume is highest, and Condition 2 is that the volume is intermediate thereof.

Figure 15:
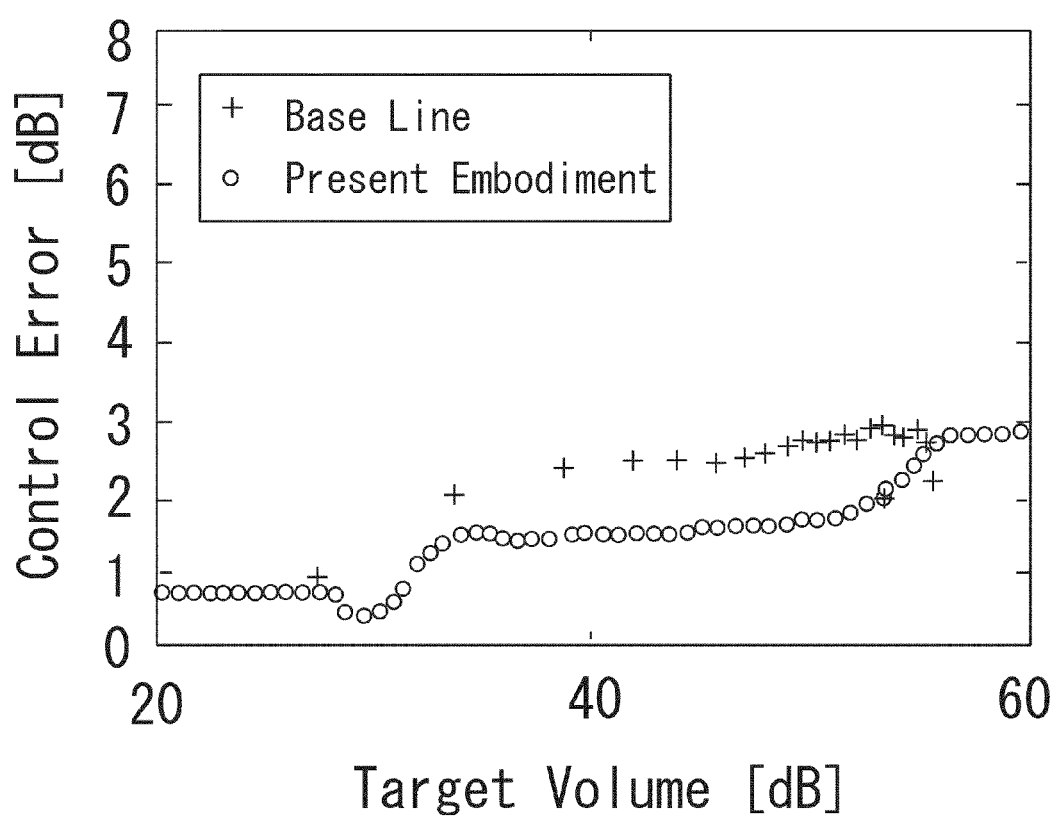
FIG. 15 is a graph showing a result of Experiment 3.

Because similar trends are found under all conditions, only experiment result of Condition 3 on behalf of conditions is shown in FIG. 15. A horizontal axis represents a target volume and a vertical axis represents a control error. A circle mark shows a result of this model and a bar mark shows a result in a case that the volume arm is fixed as a base line. Although the control error of this method may be a difference from a target value, there is no target value in the base line. Therefore, average value of the volumes when the pitches change is set as the target value and the standard deviation is defined as control error. Because a task in this experiment is to keep a given volume, the smaller volume variation means satisfactory control. Therefore, the smaller vertical axis value shows the higher performance. As shown in FIG. 15, in the base line and this method, the error is small when the target volume is approximately 25 [dB] or less. This is because original volume is low. On the other hand, when the target volume is 30-50 [dB], the error is smaller and controlled accurately in the method according to the present embodiment. However, the error is large in the vicinity of 30 [dB] being at a boundary between the silent region and the sound region. The reason is considered that the estimated error in the boundary and the polynomial model does not keep up a speed of actual volume increase. Especially, the latter has a trade-off problem that if the dimension of the polynomial model is simply increased, measurement frequency has to be increased. Therefore, in the present embodiment, decrease of measurement frequency is focused. If the target volume is in a range from 35 [dB] to 50 [dB], the performance is stable and control error is small and there is no problem practically. Then the larger the target volume is, the larger the control error becomes again. This is because it exceeds the maximum volume capable of outputting.

[Experiment 4] Portability of Thereminist System

Figure 16:
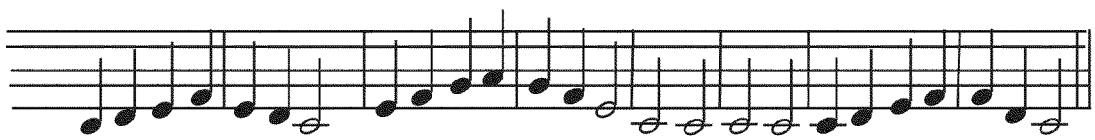
FIG. 16 is a diagram showing a musical score used in Experiment 4.

For demonstrating portability of the control method according to the present embodiment, the system is mounted on three types of humanoid robots, specifically ASIMO® produced by Honda Giken Industry Co., HRP-2™ and HIRO™ produced by Kawada Industry Co. These robots are different in not only physical structure but also control method. ASIMO® designates a hand coordinate at a three-dimensional position, as disclosed in non-patent literature 20. HRP-2™ and HIRO™ directly designate a joint angle. Further, environmental capacitances are also different because they are installed respectively in different rooms. A used musical score is a nursery rhyme "Frog Song" shown in FIG. 16. However, in order that all target pitches obtained from the score fall into a range of pitches for the theremin 1 capable of outputting, C in FIG. 16 is set C(C7) in the seventh octave in temperament.

Here, because the coordinate $x_P$, $x_V$ of the arm used for estimating parameters of the pitch model and the volume model is scalar, if three dimensional coordinate position is simply used, the dimension is inappropriate in ASIMO®. Then, the movement range of the arm is moved according to the following formula where a straight line connecting coordinate r1=(x1,y1,z1) and x2=(x2, y2, z2) is expressed by parameter t.

[Formula 16]

$$r = r_1 + t(r_1 - r_2) \tag{16}$$

Thus, this method is applicable if parameters expressing the movement range of the both arms are used respectively for $x_P$, $x_V$.

Next, evaluation metric of performance is described. In this experiment, in order to quantitatively evaluate a quality of solo performance, among three elements configuring a melody performance by the theremin: (1) pitch, (2) volume, and (3) timing, element (1) is evaluated by a square error as a unit of cent of musical score and actual performance and element (3) is evaluated by an average value of total intervals from start to end of the performance. In short, "an average value of square error between a given score and an actually performed pitch orbit" is used as an evaluation metric. The reason why the element (2) is not included in the evaluation metric of performance quality is that the volume is an important element when a partner is present for performance in concert and the volume is relatively less important in a scope of solo performance proposed by the present embodiment. Therefore, evaluation of the volume control capability is fully satisfied by Experiment 4 in the scope of the present embodiment.

A pitch orbit of respective robots is shown in FIG. 17. A horizontal axis represents time, a vertical axis represents a pitch expressed in scale of cent where a pitch (9600 [cent]) corresponding to C7 is 0. In FIG. 17, a broken line expresses pitch orbit of ASIMO®, HRP-2™, HIRO™, and the human from above. A solid line expresses a correct answer of the pitch orbit obtained from the score. The human has experience of playing the keyboard and the theremin However, with respect to performance of the human in the fourth order, pitch orbit is 300 [cent] lower than the correct answer, because the performer does not have a sense of absolute pitch. Therefore, the pitch orbit is expressed 300 [cent] higher than actual (equal to operation of major twice transposition). Time is also adjusted in response to the other robots. Here, conclusion of the below reviews does not change due to the above operations.

The quantitative evaluation result by the mean square error is described. Performance of ASIMO® is 126.8 [cent], HRP-2™ is 52.9 [cent], HIRO™ is 154.8 [cent], and the human is 112.4 [cent]. However, a square root of the error is displayed for adjusting the unit. All but HRP-2™ miss by 1 to 1.5 times of half tone because the error of 100 [cent] expresses the error of half tone with the temperament used for transforming between the sound name and the pitch in the present embodiment. Compared with the evaluation result of the human (amateur performer), it is considered that all robots well at substantially same level as the human, although HRP-2™ performs more accurately than the human.

Next, a result of ASIMO® in the first order in FIG. 17 is reviewed. Transformation of melody is slightly difficult to listen because the pitch variation is mild as a whole. Further, it plays the same target pitch differently 12 second before and 26 seconds later of the pitch because it depends on the immediate previous pose and uses a control method of different target value. However, it appears natural like a motion of the human due to this whole body control.

A result of HRP-2™ in the second order is reviewed. The pitch variation in the first step is sharp compared with ASIMO® and the same musical notes in the score are outputted at the same pitch. Accordingly melody is relatively easy to listen. Further, pitch fluctuation is found in the vicinity of 10-13 seconds and 27-35 seconds and this is caused by quick motion of massive arms of HRP-2™. Further, the appearance is mechanical because the control is carried out by joint angle.

HIRO™ in the third order is reviewed. Compared with the other robots, the pitch variation is the most sharp. The reason is that light arms are used, where fluctuation is not generated by simple control for designating joint angle. Especially, a portion where the pitch changes finely at 25-35 second is played according to the score. However, the appearance is mechanical like HRP-2™.

Finally, the human in the fourth order is reviewed. The pitch orbit is slowly curved as a whole and similar to the orbit of ASIMO® and HRP-2™. However, sharp pitch variation according to the score is found in the vicinity of 25-35 seconds like HIRO™. Next, in portions of 10-13 seconds and 23-25 seconds, fluctuation is found in the pitch orbit despite the score of constant value. This is because the human arm is difficult to be fixed. Similar fluctuation is found in the vicinity of 10 seconds in the second step. This is due to oscillation of the body and the nature is different. It is disclosed in non-patent literature 21 that fine fluctuation of the pitch in the singing voice gives a good influence on naturalness. If the body fluctuation is controlled and such the fluctuation is purposely provided based on the knowledge, a quality of performance may be improved.

[Experiment Result]

A result of evaluation experiments shows that the pitch model and the volume model of the theremin are robust to the environmental changes and the learning data changes. Further, it is confirmed that the volume is kept constant by the volume control based on the volume model. Finally, the present system is mounted on three types of robots and portability of the present system is confirmed.

I: Others

Although detailed explanation is described above, the present invention may be implemented in various manners without deviating the scope of the invention.

Values cited in the explanation of embodiments are only exemplification as a matter of course.

Robots may be configured to carry out only volume control.

Structure of the arm is not limited to the above explanation and examples of drawing.

REFERENCE SIGNS LIST

1 THEREMIN;
2 PITCH CONTROL CIRCUIT;
3 VOLUME CONTROL CIRCUIT;
4, 5 OSCILLATION CIRCUIT;
6 PITCH ANTENNA;
7 VOLUME ANTENNA;
10,10A THEREMINIST ROBOT;
11 LEFT ARM OF ROBOT;
12 RIGHT ARM OF ROBOT
14 BODY OF ROBOT
20 DRIVE UNIT
30 CONTROL UNIT
40 MEMORY UNIT
50 PARAMETER ADJUSTMENT UNIT
51 SAMPLE INFORMATION CREATION UNIT
52 PARAMETER DETERMINATION UNIT
60 SOUND ACQUISITION UNIT

What is claimed is:

1. A thereminist robot for playing a theremin comprising:
a first arm and a second arm;
a pitch model modeling correspondences between arm positions and pitches of the theremin, the pitch model having adjustable parameters a total number of which is less than the number of notes in a musical scale that the theremin is configured to produce, the adjustable parameters being independent of the pitches, wherein the theremin is played by moving the first arm to an arm position corresponding to a target musical note in accordance with the pitch model; and
a parameter adjustment unit that calibrates said parameters of the pitch model that change depending on an environment surrounding the theremin so that the pitches produced by the theremin in accordance with the pitch model become more accurate in the environment.

2. The thereminist robot according to claim 1, further comprising:
a volume model modeling correspondences between arm positions and volume of the theremin,
wherein the second arm controls volume of the theremin, and wherein the parameter adjustment unit also calibrates parameters of the volume model that change depending on an environment surrounding the theremin so that the volume produced by the theremin in accordance with the volume model becomes more accurate in the environment.

3. The thereminist robot according to any one of claims 1 to 2, wherein after moving the first arm, feedback control is carried out for adjusting positions of the first arm during continuation of notes.

4. The thereminist robot according to claim 1, wherein the pitch model is formulated by the following formula:

$$p = \frac{\theta_2}{(\theta_0 - x_p)^{\theta_1}} + \theta_3$$

where $x_p$ is a position of the first arm, $\theta_0, \theta_1, \theta_2$, and $\theta_3$ are said adjustable parameters, and p is a pitch.

* * * * *